(12) United States Patent
So et al.

(10) Patent No.: US 12,517,619 B2
(45) Date of Patent: Jan. 6, 2026

(54) ELECTRONIC DEVICE

(71) Applicant: Samsung Display Co., Ltd., Yongin-Si (KR)

(72) Inventors: Yongsub So, Yongin-si (KR);
Gwang-Bum Ko, Yongin-si (KR);
Sanghun Park, Yongin-si (KR);
Yong-Hwan Park, Yongin-si (KR);
Kangwon Lee, Yongin-si (KR);
Sanghyun Lim, Yongin-si (KR);
Jeongyun Han, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/956,016

(22) Filed: Nov. 22, 2024

(65) Prior Publication Data

US 2025/0231650 A1    Jul. 17, 2025

(30) Foreign Application Priority Data

Jan. 16, 2024  (KR) .................. 10-2024-0006515

(51) Int. Cl.
*G06F 3/044*       (2006.01)
*G06F 3/041*       (2006.01)

(52) U.S. Cl.
CPC ........ *G06F 3/0446* (2019.05); *G06F 3/04164* (2019.05); *G06F 3/0441* (2019.05); *G06F 3/0442* (2019.05); *G06F 2203/04104* (2013.01)

(58) Field of Classification Search
CPC .. G06F 3/0446; G06F 3/04164; G06F 3/0441; G06F 3/0442; G06F 2203/04104
See application file for complete search history.

(56) References Cited

U.S. PATENT DOCUMENTS

| | | | |
|---|---|---|---|
| 11,650,688 B2 * | 5/2023 | Kim ................ | G06F 3/04186 345/174 |
| 2018/0210575 A1 * | 7/2018 | Xie ................. | G06F 3/0446 |
| 2019/0115395 A1 * | 4/2019 | Lee ................. | G06F 3/0443 |
| 2020/0249793 A1 * | 8/2020 | Xu .................. | G06F 3/0446 |
| 2022/0206636 A1 * | 6/2022 | Lu .................. | G06F 3/0412 |
| 2022/0404931 A1 * | 12/2022 | Kim ................ | G06F 3/04164 |

FOREIGN PATENT DOCUMENTS

| KR | 10-2020-0020250 A | 2/2020 |
|---|---|---|
| KR | 10-2022-0018116 A | 2/2022 |

\* cited by examiner

*Primary Examiner* — Amit Chatly
(74) *Attorney, Agent, or Firm* — Innovation Counsel LLP

(57) ABSTRACT

Disclosed is an electronic device including a sensor layer and a sensor driver that operates in a first mode for sensing a touch input and a second mode for sensing a pen input. The sensor layer includes a plurality of first electrodes, a plurality of second electrodes, a plurality of first auxiliary electrodes, and a plurality of second auxiliary electrodes. In the first mode, the sensor driver outputs a transmission signal to at least one of the plurality of first electrodes, receives a sensing signal from the plurality of second electrodes, receives an auxiliary signal from at least one of the plurality of first auxiliary electrodes and the plurality of second auxiliary electrodes, and compensates for the sensing signal based on the auxiliary signal.

20 Claims, 28 Drawing Sheets

ELECTRONIC DEVICE

CROSS-REFERENCE TO RELATED APPLICATIONS

This application claims priority under 35 U.S.C. § 119 to Korean Patent Application No. 10-2024-0006515 filed on Jan. 16, 2024, in the Korean Intellectual Property Office, the disclosures of which are incorporated by reference herein in their entireties.

BACKGROUND

Embodiments of the present disclosure described herein relate to an electronic device capable of sensing an input by a pen.

Each of multimedia electronic devices such as a TV, a mobile phone, a tablet personal computer (PC), a notebook computer, a navigation system, a game console, and the like includes a display device that displays an image. In addition to a general input method such as a button, a keyboard, a mouse, or the like, the electronic devices may include a sensor layer (or an input sensor) capable of providing a touch-based input method that allows a user to enter information or commands easily and intuitively. The sensor layer may sense a user's touch or pressure. In the meantime, there is an increasing demand for employing a pen for a fine touch input for a user who is accustomed to entering information by using writing instruments or for a specific application (e.g., an application for sketching or drawing).

SUMMARY

Embodiments of the present disclosure provide an electronic device capable of sensing inputs from passive passive-type input means, for example, a user's body and active-type input means, for example, a pen PN or an RFIC tag.

Embodiments of the present disclosure provide an electronic device with a sensor layer with improved sensing performance.

According to an embodiment, an electronic device includes a sensor layer and a sensor driver that drives the sensor layer and operates in a first mode for sensing a touch input and a second mode for sensing a pen input. The sensor layer includes a plurality of first electrodes arranged in a first direction and extending in a second direction intersecting the first direction, a plurality of second electrodes arranged in the second direction and extending in the first direction, a plurality of first auxiliary electrodes arranged in the first direction, extending in the second direction, and overlapping the plurality of first electrodes, respectively, and a plurality of second auxiliary electrodes arranged in the second direction, extending in the first direction, and overlapping the plurality of second electrodes, respectively. In the first mode, the sensor driver outputs a transmission signal to at least one of the plurality of first electrodes, receives a sensing signal from the plurality of second electrodes, receives an auxiliary signal from at least one of the plurality of first auxiliary electrodes and the plurality of second auxiliary electrodes, and compensates for the sensing signal based on the auxiliary signal.

The sensor driver may include a compensation determination circuit that determines whether compensation of the sensing signal is necessary, and a compensator that compensates for the sensing signal depending on a determination result of the compensation determination circuit.

The compensation determination circuit may be configured to detect a peak value of a change amount in mutual capacitance between the plurality of first electrodes and the plurality of second electrodes, and to determine that the compensation of the sensing signal is necessary, when the number of the peak value is greater than or equal to two.

The compensation determination circuit may be configured to compare maximum intensity of the auxiliary signal with reference intensity, and to determine that the compensation of the sensing signal is necessary when the maximum intensity of the auxiliary signal is greater than the reference intensity.

The compensation determination circuit may be configured to detect a peak value of a change amount in mutual capacitance between the plurality of first electrodes and the plurality of second electrodes, and to determine that the compensation of the sensing signal is necessary, when the number of the peak value is greater than or equal to two and maximum intensity of the auxiliary signal is greater than reference intensity.

The second mode may include a pen sensing driving mode. The plurality of first auxiliary electrodes may be electrically connected to a ground in the pen sensing driving mode and the plurality of second auxiliary electrodes may be electrically connected to a ground in the pen sensing driving mode.

A plurality of first coupling capacitors may be defined between one first electrode of the plurality of first electrodes and one first auxiliary electrode of the plurality of first auxiliary electrodes. A plurality of second coupling capacitors may be defined between one second electrode of the plurality of second electrodes and one second auxiliary electrode of the plurality of second auxiliary electrodes. In the pen sensing driving mode, the sensor driver may receive a first induced current flowing toward the one first electrode from the one first auxiliary electrode through the plurality of first coupling capacitors, and may receive a second induced current flowing toward the one second electrode from the one second auxiliary electrode through the plurality of second coupling capacitors.

The second mode may further include a charging driving mode. In the charging driving mode, the sensor driver may be configured to apply a first signal to at least one first auxiliary electrode among the plurality of first auxiliary electrodes, and to apply a second signal to at least another first auxiliary electrode. A current path is formed between the at least one first auxiliary electrode and the at least another first auxiliary electrode.

The sensor driver may be configured to selectively operate in one of a first operating mode for waiting for the touch input and the pen input, a second operating mode for sensing the touch input and waiting for the pen input, or a third operating mode for sensing the pen input. In each of the first operating mode and the second operating mode, the sensor driver may be configured to repeatedly operate in the first mode and the second mode. In the third operating mode, the sensor driver may be configured to operate in the second mode.

The second operating mode may further include a third mode for sensing the touch input. In the third mode, the sensor driver may be configured to output a transmission signal to at least one of the plurality of first electrodes, and to receive a sensing signal from the plurality of second electrodes. The plurality of first auxiliary electrodes and the plurality of second auxiliary electrodes may be grounded.

In the second operating mode, the sensor driver may be configured to repeatedly operate in the second mode, the third mode, and the first mode.

In the second operating mode, the sensor driver may be configured to repeatedly operate in the second mode and the first mode when it is determined that compensation of the sensing signal is necessary. In the second operating mode, the sensor driver may be configured to repeatedly operate in the second mode and the third mode when it is determined that the compensation of the sensing signal is not necessary.

The sensor layer may include a plurality of first trace lines electrically connected to the plurality of first electrodes, respectively, a plurality of second trace lines electrically connected to the plurality of second electrodes, respectively, a third trace line electrically connected to the plurality of first auxiliary electrodes, a fourth trace line electrically connected to the plurality of second auxiliary electrodes, and a plurality of fifth trace lines electrically connected to the plurality of first auxiliary electrodes. The sensor driver may be configured to receive the auxiliary signal through at least one of the plurality of fifth trace lines and the fourth trace line in the first mode.

According to an embodiment, an electronic device includes a sensor layer including a plurality of first electrodes, a plurality of second electrodes, a plurality of first auxiliary electrodes, and a plurality of second auxiliary electrodes, and a sensor driver drives the sensor layer and operate in one of a first operating mode for waiting for the touch input and the pen input, a second operating mode for sensing the touch input and waiting for the pen input, and a third operating mode for sensing the pen input. In the second operating mode, the sensor driver is configured to output a transmission signal to at least one of the plurality of first electrodes, and to receive a sensing signal from the plurality of second electrodes, wherein the second operating mode includes a compensation sensing mode in which an auxiliary signal is received from at least one of the plurality of first auxiliary electrodes and the plurality of second auxiliary electrodes. In the third operating mode, the sensor driver is configured to apply a first signal to at least one first auxiliary electrode among the plurality of first auxiliary electrodes, and to apply a second signal to at least another first auxiliary electrode. The third operating mode includes a charging driving mode in which a current path is formed between the at least one first auxiliary electrode and the at least another first auxiliary electrode.

The second operating mode may further include a normal mode for sensing the touch input. In the normal mode, the sensor driver may be configured to output a transmission signal to at least one of the plurality of first electrodes, and to receive a sensing signal from the plurality of second electrodes. The plurality of first auxiliary electrodes and the plurality of second auxiliary electrodes may be grounded.

In the second operating mode, the sensor driver may be configured to repeatedly operate in the normal mode and the compensation sensing mode.

In the second operating mode, the sensor driver may be configured to operate in the compensation sensing mode when it is determined that compensation of the sensing signal is necessary. In the second operating mode, the sensor driver may be configured to operate in the normal mode when it is determined that the compensation of the sensing signal is not necessary.

The sensor driver may include a compensation determination circuit that determines whether compensation of the sensing signal is necessary, and a compensator that compensates for the sensing signal depending on a determination result of the compensation determination circuit.

The compensation determination circuit may be configured to detect a peak value of a change amount in mutual capacitance between the plurality of first electrodes and the plurality of second electrodes, and to determine that the compensation of the sensing signal is necessary, when the number of the peak value is greater than or equal to two.

The compensation determination circuit may be configured to compare maximum intensity of the auxiliary signal with reference intensity, and to determinate that the compensation of the sensing signal is necessary, when the maximum intensity is greater than the reference intensity.

The compensation determination circuit may be configured to detect a peak value of a change amount in mutual capacitance between the plurality of first electrodes and the plurality of second electrodes, and to determine that the compensation of the sensing signal is necessary, when the number of the peak value is greater than or equal to two and maximum intensity of the auxiliary signal is greater than reference intensity.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1A:
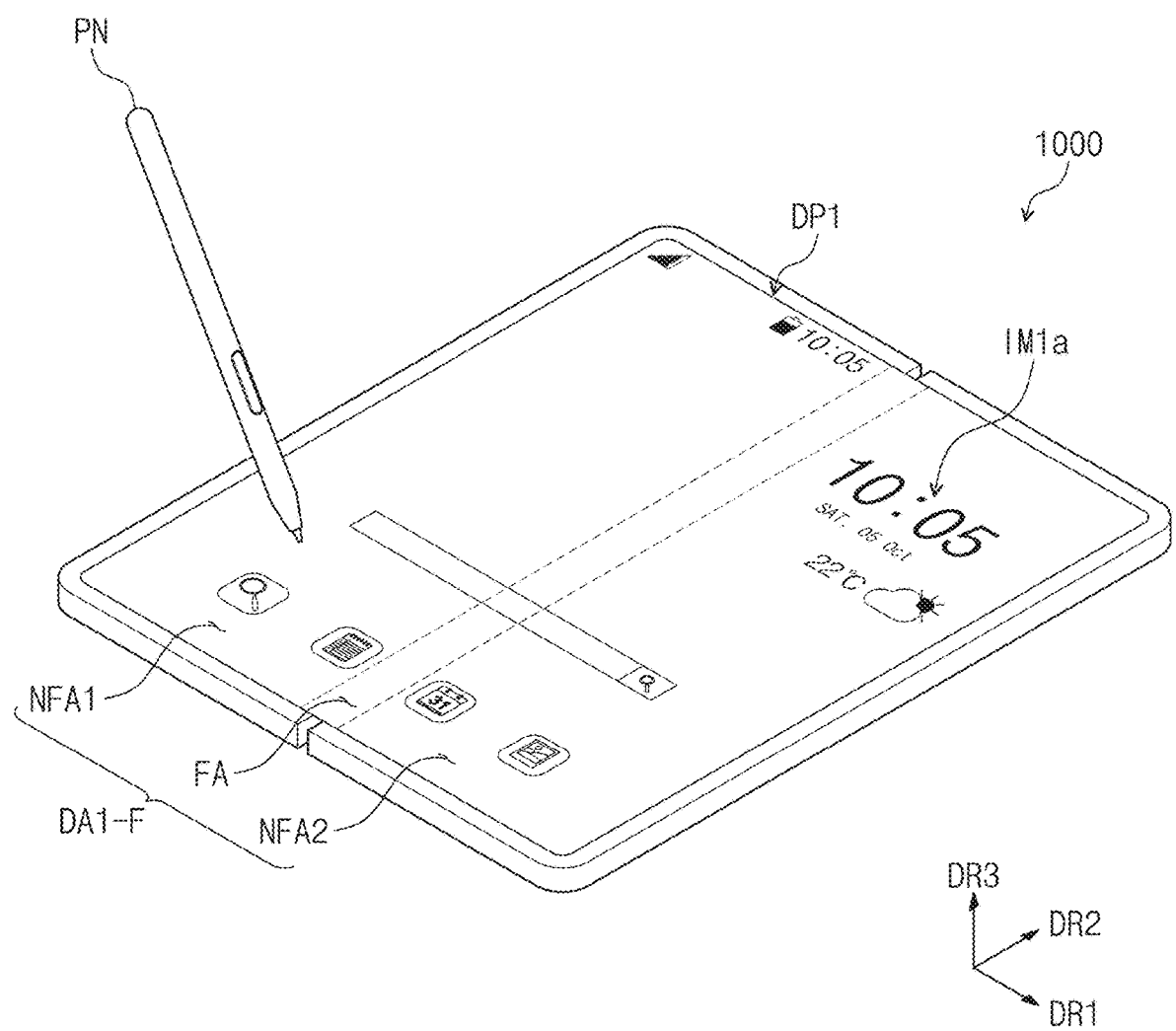
FIG. 1A is a perspective view of an electronic device according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Terms "part" and "unit" mean a software component or hardware component that performs a specific function. For example, the hardware component may include a field-programmable gate array (FPGA) or an application-specific integrated circuit (ASIC). The software component may refer to executable codes and/or data used by the executable codes in an addressable storage medium. Accordingly, the software components may be, for example, object-oriented software components, class components, and task components, and may include processes, functions, attributes, procedures, subroutines, program code segments, drivers, firmware, microcodes, circuits, data, databases, data structures, tables, arrays, or variables.

Hereinafter, embodiments of the present disclosure will be described with reference to accompanying drawings.

Figure 1B:
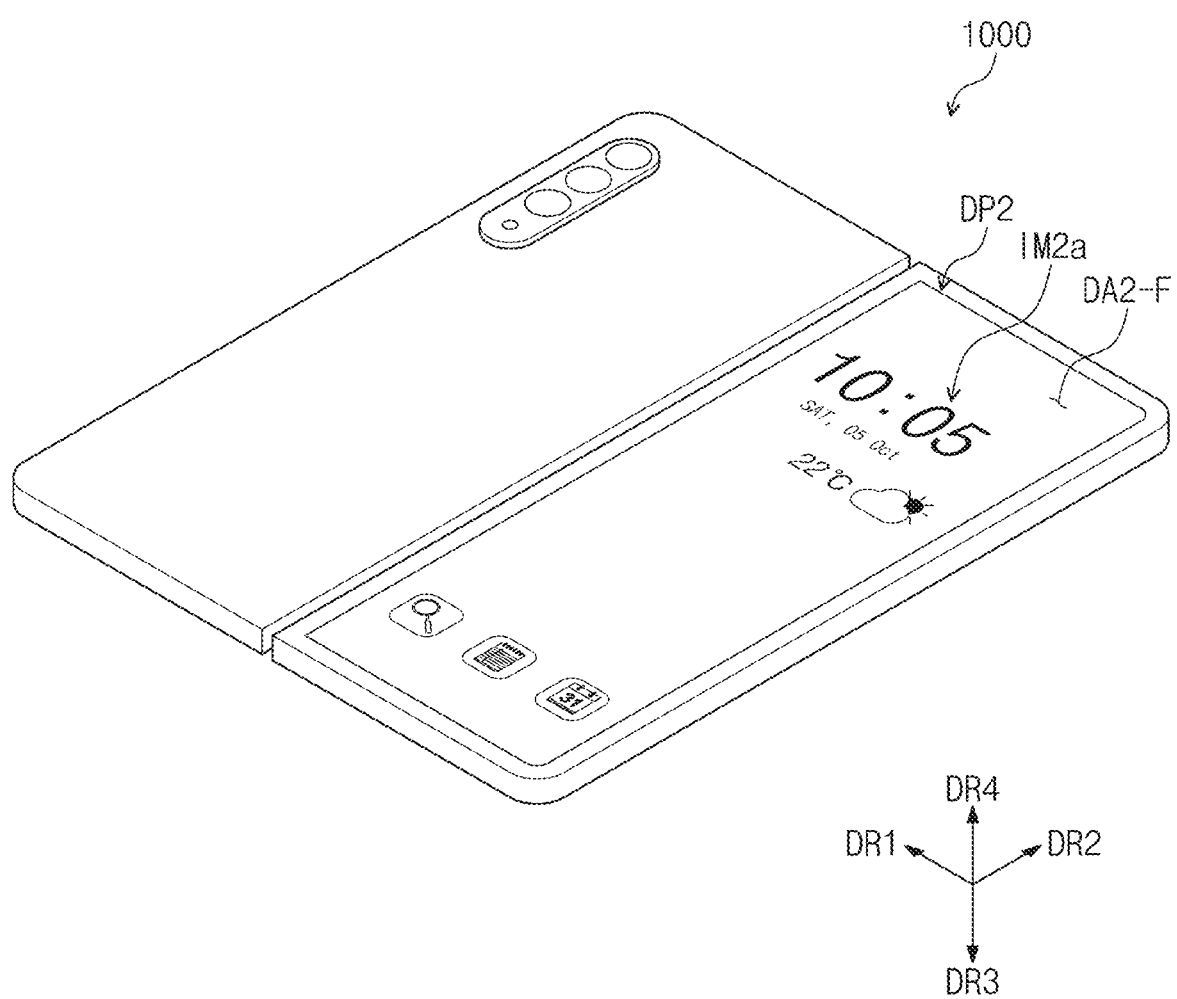
FIG. 1B is a rear perspective view of an electronic device according to an embodiment of the present disclosure.

FIG. 1A is a perspective view of an electronic device 1000 according to an embodiment of the present disclosure. FIG. 1B is a rear perspective view of the electronic device 1000 according to an embodiment of the present disclosure.

Referring to FIGS. 1A and 1B, the electronic device 1000 may be a device activated depending on an electrical signal. For example, the electronic device 1000 may display an image and may sense inputs applied from the outside. The external input may be a user input. The user input may include various types of external inputs from a part of the body of a user, a pen PN, light, heat, or pressure.

The electronic device 1000 may include a first display panel DP1 and a second display panel DP2. The first display panel DP1 and the second display panel DP2 may be panels separate from each other. The first display panel DP1 may be referred to as a "main display panel". The second display panel DP2 may be referred to as an "auxiliary display panel" or "external display panel".

The first display panel DP1 may include a first display part DA1-F. The second display panel DP2 may include a second display part DA2-F. An area of the second display panel DP2 may be smaller than an area of the first display panel DP1. The area of the first display part DA1-F which corresponds to the first display panel DP1 may be greater than the area of the second display part DA2-F which corresponds to the second display panel DP2.

While the electronic device 1000 is unfolded, the first display part DA1-F may have a plane substantially parallel to the first direction DR1 and the second direction DR2. A thickness direction of the electronic device 1000 may be parallel to a third direction DR3 intersecting the first direction DR1 and the second direction DR2. Front surfaces (or upper surfaces) and back surfaces (or lower surfaces) of members constituting the electronic device 1000 may be defined with respect to the third direction DR3.

The first display panel DP1 or the first display part DA1-F may include a folding area FA, which is foldable and unfoldable, and a plurality of non-folding areas NFA1 and NFA2 spaced apart from each other with the folding area FA disposed therebetween. The second display panel DP2 may overlap one of the plurality of non-folding areas NFA1 and NFA2. For example, the second display panel DP2 may overlap the first non-folding area NFA1.

A display direction of a first image IM1a displayed in a part of the first display panel DP1 (e.g., the first non-folding area NFA1) may be opposite to a display direction of a second image IM2a displayed in the second display panel DP2. For example, the first image IM1a may be displayed in the third direction DR3, and the second image IM2a may be displayed in a fourth direction DR4, which is the opposite direction to the third direction DR3.

In an embodiment of the present disclosure, the folding area FA may be bent with respect to a folding axis extending in a direction (e.g., the second direction DR2) parallel to a long side of the electronic device 1000. While the electronic device 1000 is folded, the folding area FA has a predetermined curvature and radius of curvature. The first non-folding area NFA1 and the second non-folding area NFA2 may face each other, and the electronic device 1000 may be inner-folded such that the first display part DA1-F is not exposed to the outside.

In an embodiment of the present disclosure, the electronic device 1000 may be outer-folded such that the first display part DA1-F is exposed to the outside. In an embodiment of the present disclosure, the electronic device 1000 may be capable of both in-folding and out-folding in an unfolded state, but is not limited thereto.

FIG. 1A illustrates that one folding area FA is defined (provided or included) in the electronic device 1000, but the present disclosure is not limited thereto. For example, a plurality of folding axes and a plurality of folding areas corresponding thereto are defined in the electronic device 1000. The electronic device 1000 may be in-folded or out-folded in a state where each of the plurality of folding areas is unfolded.

According to an embodiment of the present disclosure, at least one of the first display panel DP1 and the second display panel DP2 may sense an input by the pen PN even when it does not include a digitizer. Accordingly, because the digitizer for sensing the pen PN is omitted, an increase in the thickness of the electronic device 1000, an increase in the weight of the electronic device 1000, or a decrease in flexibility of the electronic device 1000 which may occur due to the addition of a digitizer may not occur. Accordingly, not only the first display panel DP1 but also the second display panel DP2 may be designed to sense the pen PN.

Figure 2:
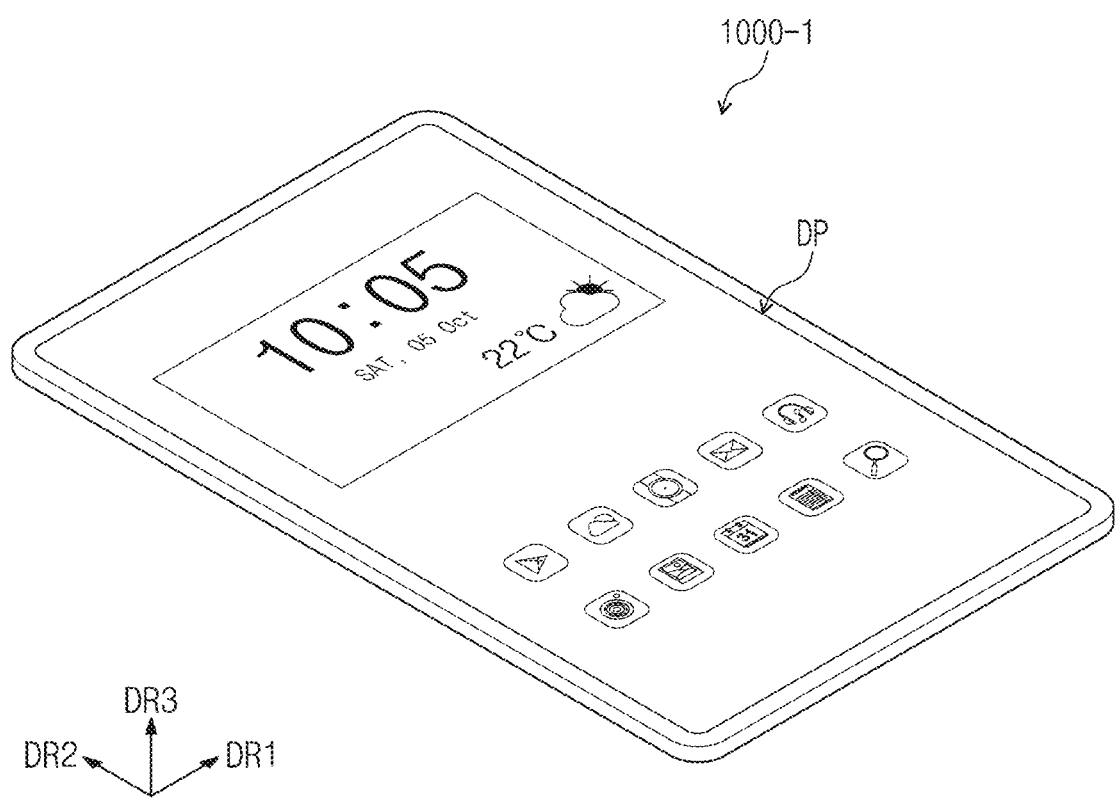
FIG. 2 is a perspective view of an electronic device according to an embodiment of the present disclosure.
Figure 3:
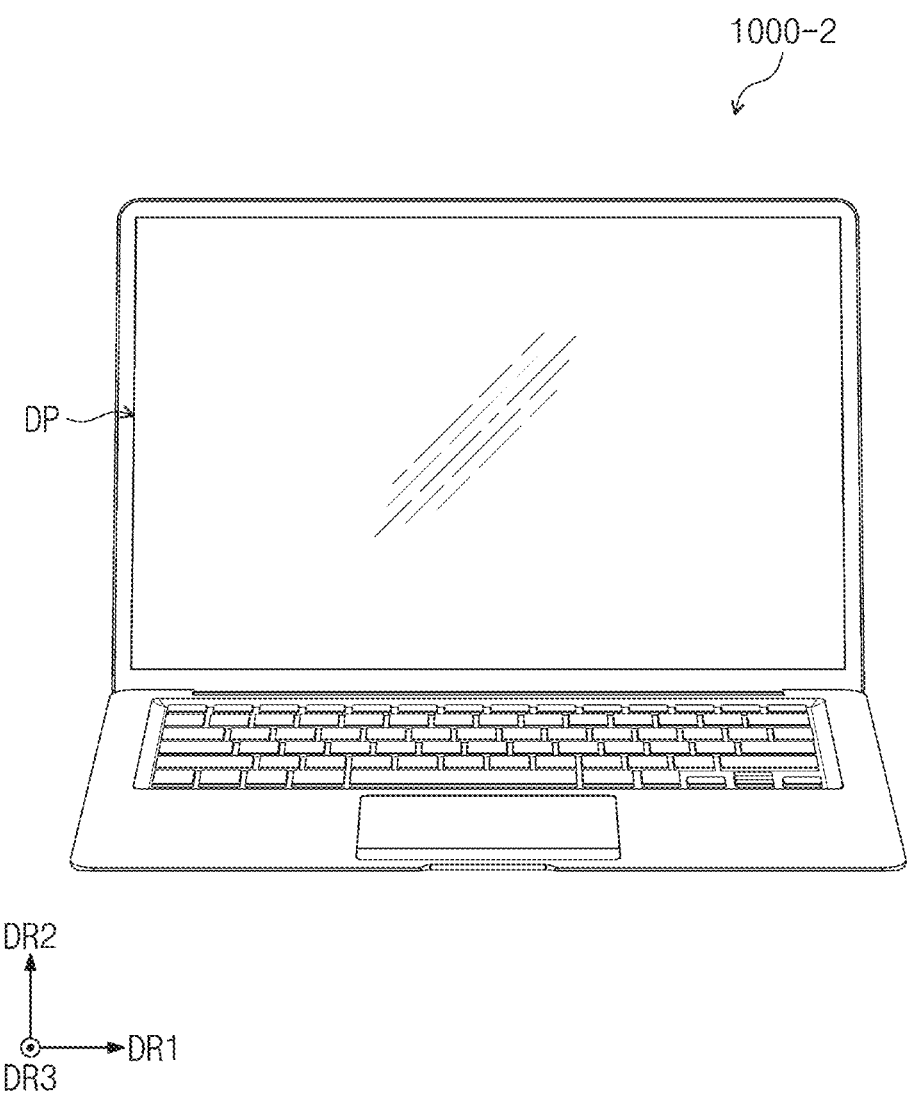
FIG. 3 is a perspective view of an electronic device according to an embodiment of the present disclosure.

FIG. 2 is a perspective view of an electronic device 1000-1, according to an embodiment of the present disclosure. FIG. 3 is a perspective view of an electronic device 1000-2, according to an embodiment of the present disclosure.

FIG. 2 shows that the electronic device 1000-1 is a mobile phone, and the electronic device 1000-1 may include a display panel DP. FIG. 3 shows that the electronic device 1000-2 is a notebook PC, and the electronic device 1000-2 may include a display panel DP. Although FIG. 3 is the perspective view of an electronic device 1000-2, the coordinate axes included in FIG. 3 are displayed based on the display panel DP within the electronic device 1000-2.

In an embodiment of the present disclosure, the display panel DP may sense inputs applied from the outside. The external input may be a user input. The user input may include various types of external inputs from a part of the body of a user, a pen PN (see FIG. 1A), light, heat, or pressure.

According to an embodiment of the present disclosure, the display panel DP may sense an input by the pen PN even though the display panel DP does not include a digitizer. Accordingly, because the digitizer for sensing the pen PN is omitted, the thickness and weight of the electronic device 1000-1 or 1000-2 may not increase due to the addition of a digitizer.

FIG. 1A shows a foldable type of the electronic device 1000, and FIG. 2 shows a bar type of the electronic device 1000-1. However, the present disclosure described below is not limited thereto. For example, the descriptions described below may be applied to various electronic devices such as a rollable electronic device, a slidable electronic device, and a stretchable electronic device.

Figure 4:
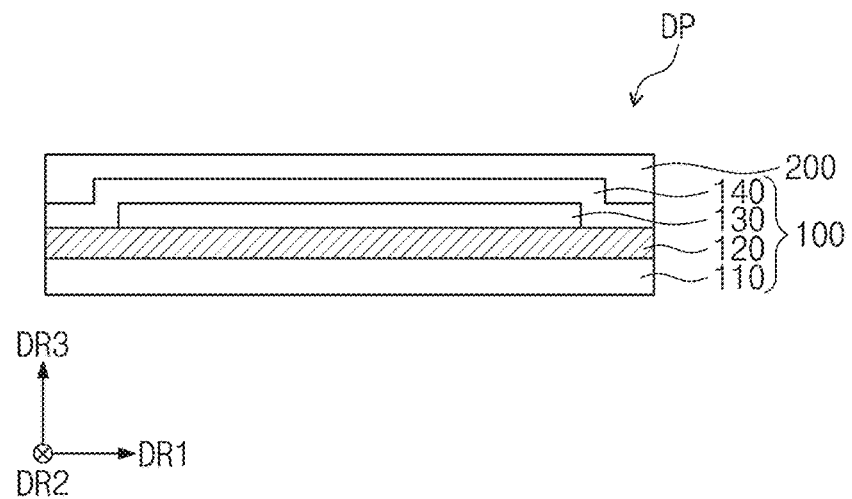
FIG. 4 is a schematic cross-sectional view of a display panel according to an embodiment of the present disclosure.

FIG. 4 is a schematic cross-sectional view of the display panel DP according to an embodiment of the present disclosure.

Referring to FIG. 4, the display panel DP may include a display layer 100 and a sensor layer 200.

The display layer 100 may be a component that substantially generates an image. The display layer 100 may be a light emitting display layer. For example, the display layer 100 may be an organic light emitting display layer, an inorganic light emitting display layer, an organic-inorganic light emitting display layer, a quantum dot display layer, a micro-LED display layer, or a nano-LED display layer. The display layer 100 may include a base layer 110, a circuit layer 120, a light emitting element layer 130, and an encapsulation layer 140.

The base layer 110 may be a member that provides a base surface on which the circuit layer 120 is disposed. The base layer 110 may include a multi-layer structure or a single layer structure. The base layer 110 may be a glass substrate, a metal substrate, a silicon substrate, or a polymer substrate, but the layer constituting the base layer 110 is not particularly limited thereto.

The circuit layer 120 may be disposed on the base layer 110. The circuit layer 120 may include an insulating layer, a semiconductor pattern, a conductive pattern, and a signal line. The insulating layer, the semiconductor layer, and the conductive layer may be formed on the base layer 110 in a manner such as coating, evaporation, or the like. The insulating layer, the semiconductor layer, and the conductive layer may be selectively patterned by performing a photolithography process multiple times.

The light emitting element layer 130 may be disposed on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from foreign substances such as moisture, oxygen, and dust particles.

The sensor layer 200 may be disposed on the display layer 100. The sensor layer 200 may sense an external input applied from the outside. The sensor layer 200 may be an integrated sensor formed continuously during the manufacturing process of the display layer 100, or may be an external sensor attached to the display layer 100. The sensor layer 200 may be referred to as a "sensor", an "input sensing layer", an "input sensing panel", or an "electronic device for sensing input coordinates".

According to an embodiment of the present disclosure, the sensor layer 200 may sense both inputs from a passive-type input means such as the user's body and an input device for generating a magnetic field of a predetermined resonant frequency. The input device may be referred to as a "pen", an "input pen", a "magnetic pen", a "stylus pen", or an "electromagnetic resonance pen".

Figure 5:
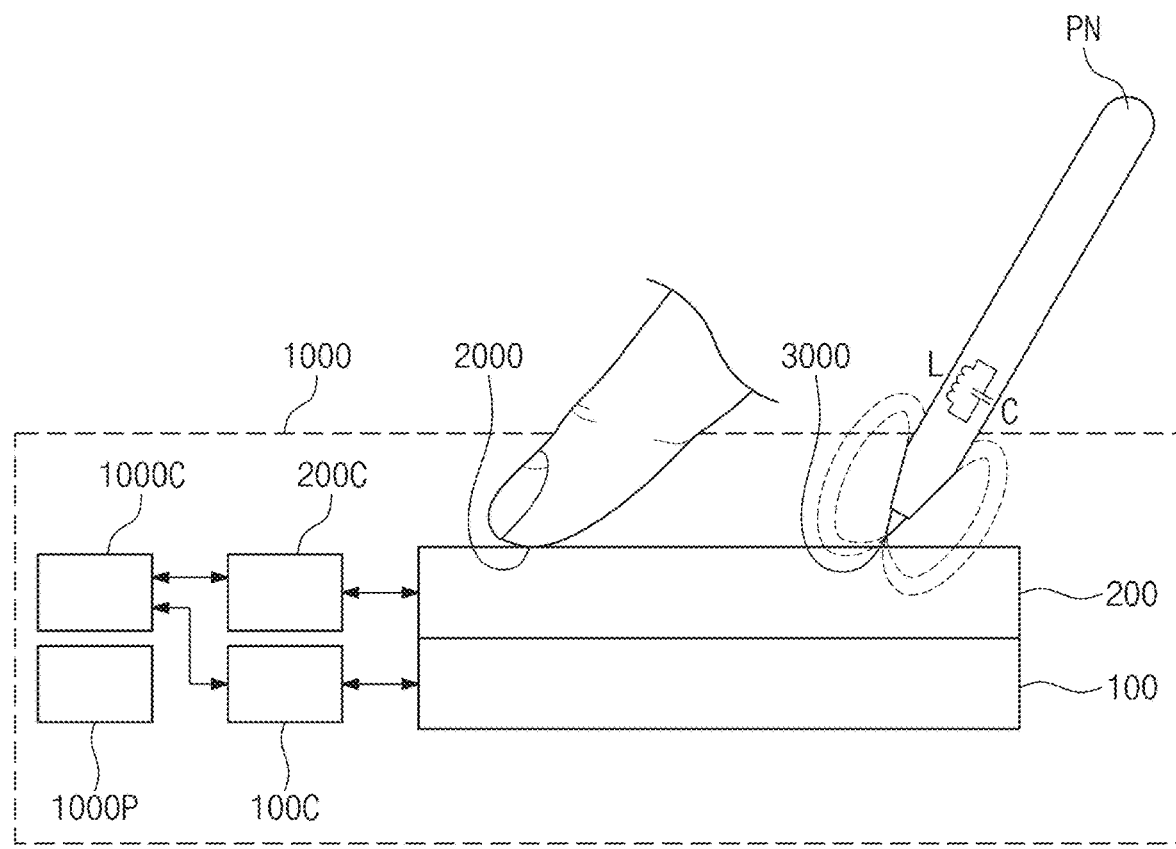
FIG. 5 is a block diagram for describing an operation of an electronic device according to an embodiment of the present disclosure.

FIG. 5 is a block diagram for describing an operation of the electronic device 1000 according to an embodiment of the present disclosure.

Referring to FIG. 5, the display device 1000 may include a display layer 100, a sensor layer 200, a display driver 100C, a sensor driver 200C, a main driver 1000C, and a power supply circuit 1000P.

The sensor layer 200 may sense a first input 2000 or a second input 3000 applied from the outside. Each of the first input 2000 and the second input 3000 may be an input means capable of providing a change in the capacitance of the sensor layer 200 or an input means capable of causing an induced current in the sensor layer 200. For example, the first input 2000 may be an input from passive type input means such as a user's body. The second input 3000 may be an input by the pen PN or an input by an RFIC tag. For example, the pen PN may be a passive-type pen or an active-type pen.

In an embodiment of the present disclosure, the pen PN may be a device that generates a magnetic field of a predetermined resonant frequency. The pen PN may be configured to transmit an output signal based on an electromagnetic resonance method. The pen PN may be referred to as an "input device", an "input pen", a "magnetic pen", a "stylus pen", or an "electromagnetic resonance pen".

The pen PN may include an RLC resonant circuit, and the RLC resonant circuit may include a resistor R, an inductor L and a capacitor C. In an embodiment of the present disclosure, the RLC resonant circuit may be a variable resonant circuit that varies a resonance frequency. In this case, the inductor L may be a variable inductor and/or the capacitor C may be a variable capacitor, but the configuration of the inductor L and the capacitor C are not particularly limited thereto.

The inductor L generates a current by a magnetic field formed in the electronic device 1000, for example, the sensor layer 200. However, an embodiment is not particularly limited thereto. For example, when the pen PN operates in an active type, the pen PN may generate a current even when the pen PN does not receive a magnetic field from the outside. The generated current is delivered to the capacitor C. The capacitor C charges the current input from the inductor L, and discharges the charged current to the inductor L. Afterwards, the inductor L may emit a magnetic field at the resonant frequency. An induced current may flow in the sensor layer 200 by the magnetic field emitted by the pen PN, and the induced current may be delivered to the sensor driver 200C as a sensing signal (or a reception signal).

The main driver 1000C may control overall operations of the electronic device 1000. For example, the main driver 1000C may control operations of the display driver 100C and the sensor driver 200C. The main driver 1000C may include at least one microprocessor and may further include a graphics controller. The main driver 1000C may be referred to as an "application processor", "central processing unit", or "main processor".

The display driver 100C may drive the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 200C may drive the sensor layer 200. The sensor driver 200C may receive a control signal from the main driver 1000C. The control signal may include a clock signal of the sensor driver 200C. Moreover, the control signal may further include a mode determination signal for determining operating modes of the sensor driver 200C and the sensor layer 200.

The sensor driver 200C may be implemented as an integrated circuit (IC) and may be electrically connected to the sensor layer 200. For example, the sensor driver 200C may be mounted directly on a predetermined area of the display panel or mounted on a separate printed circuit board in a chip-on-film (COF) method to be electrically connected to the sensor layer 200.

The sensor driver 200C and the sensor layer 200 may selectively operate in a first mode or a second mode. For example, the first mode may be a mode in which a touch input, for example, the first input 2000 is sensed. The second mode may be a mode in which an input of the pen PN, for example, the second input 3000 is sensed. The first mode may be referred to as a "touch sensing mode", and the second mode may be referred to as a "pen sensing mode".

The switching between the first mode and the second mode may be accomplished in a variety of manners. For example, the sensor driver 200C and the sensor layer 200 may be driven in a time-division method in the first mode and the second mode and may sense the first input 2000 and the second input 3000. Alternatively, the switching between the first mode and the second mode may occur due to a user's selection or the user's specific action (or input), either the first mode or the second mode may be activated or deactivated by activating or deactivating a specific application, or one mode may be switched to the other mode. Alternatively, while operating alternately in the first mode and the second mode, the sensor driver 200C and the sensor layer 200 may be maintained in the first mode when the first input 2000 is sensed, or may be maintained in the second mode when the second input 3000 is sensed.

The sensor driver 200C may calculate coordinate information of an input based on a signal received from the sensor layer 200 and may provide the main driver 1000C with a coordinate signal having the coordinate information. The main driver 1000C executes an operation corresponding to a user input based on the coordinate signal. For example, the main driver 1000C may operate the display driver 100C such that a new application image is displayed on the display layer 100.

The power supply circuit 1000P may include a power management integrated circuit (PMIC). The power supply circuit 1000P may generate a plurality of driving voltages for driving the display layer 100, the sensor layer 200, the display driver 100C, and the sensor driver 200C. For example, the plurality of driving voltages may include a gate high voltage, a gate low voltage, a first driving voltage (e.g., ELVSS voltage), a second driving voltage (e.g., ELVDD voltage), an initialization voltage, and the like, but the plurality of driving voltages are not particularly limited to the example.

Figure 6A:
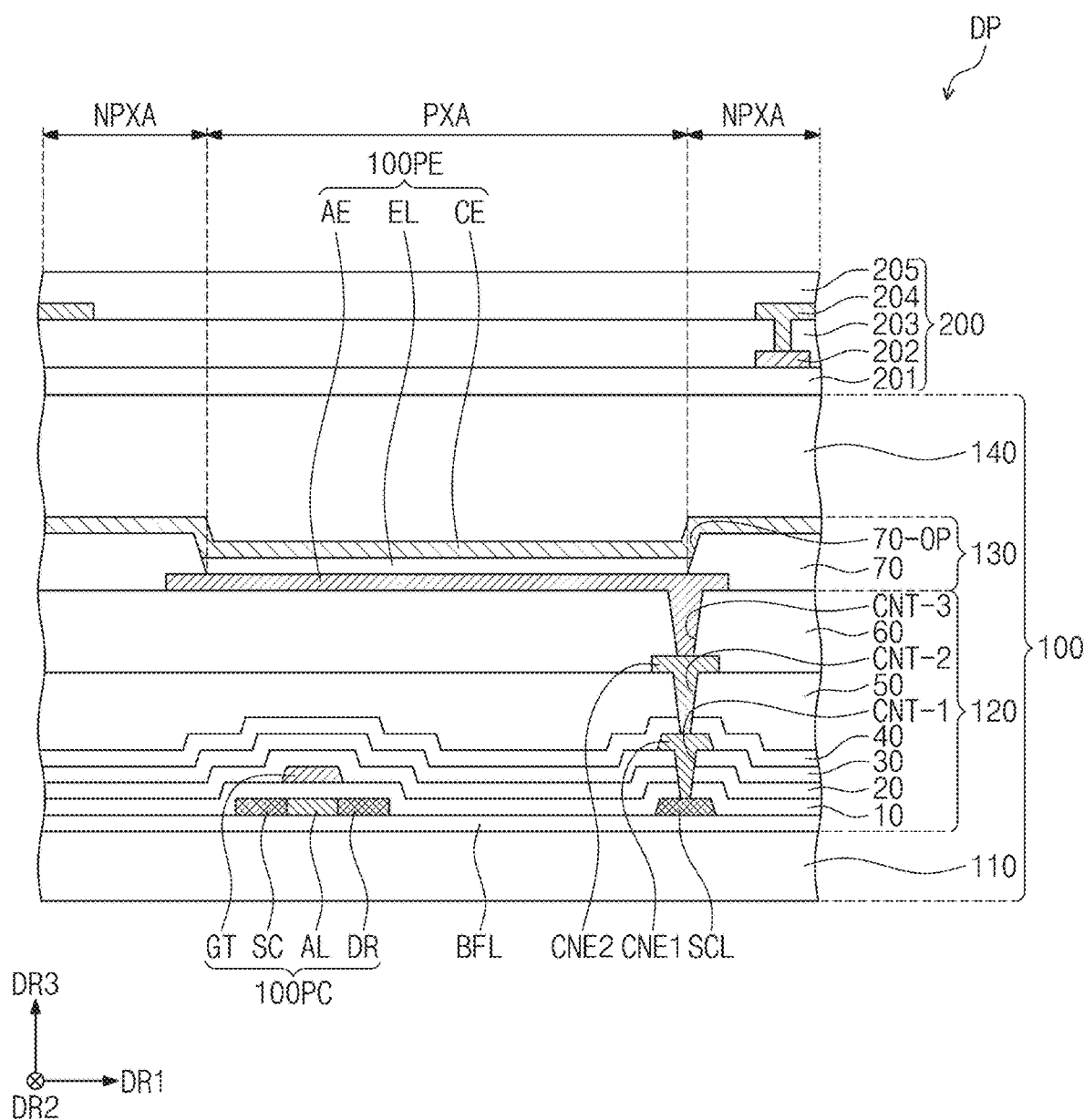
FIG. 6A is a cross-sectional view of a display panel according to an embodiment of the present disclosure.

FIG. 6A is a cross-sectional view of the display panel DP according to an embodiment of the present disclosure.

Referring to FIG. 6A, at least one buffer layer BFL is formed on an upper surface of the base layer 110. The buffer layer BFL may improve a bonding force between the base layer 110 and a semiconductor pattern. The buffer layer BFL may be formed of multiple layers. The display layer 100 may further include a barrier layer disposed on the buffer layer BFL. The buffer layer BFL may include at least one of silicon oxide, silicon nitride, and silicon oxynitride. For example, the buffer layer BFL may include a structure in which a silicon oxide layer and a silicon nitride layer are stacked alternately.

The semiconductor patterns SC, AL, DR, and SCL may be disposed on the buffer layer BFL. The semiconductor patterns SC, AL, DR, and SCL may include polysilicon. However, an embodiment is not limited thereto. For example, the semiconductor patterns SC, AL, DR, and SCL may include amorphous silicon, low-temperature polycrystalline silicon, or an oxide semiconductor.

FIG. 6A only illustrates a part of the semiconductor patterns SC, AL, DR, and SCL, and the semiconductor pattern may be further disposed in another area. The semiconductor patterns SC, AL, DR, and SCL may be arranged across pixels in a specific rule. The semiconductor patterns SC, AL, DR, and SCL may have a different electrical property depending on a doping level of the semiconductor patterns SC, AL, DR, and SCL. The semiconductor patterns SC, AL, DR, and SCL may include the first areas SC, DR, and SCL having a high conductivity, and the second area AL having a low conductivity. The first areas SC, DR, and SCL may be heavily doped with an N-type dopant or a P-type dopant. A P-type transistor may include an area doped with the P-type dopant, and an N-type transistor may include an area doped with the N-type dopant. The second area AL may be an undoped area or a lightly doped area doped with a concentration lower than a concentration in the first area SC, DR, or SCL.

A conductivity of each of the first areas SC, DR, and SCL is greater than a conductivity of the second area AL. The first areas SC, DR, and SCL may substantially serves as an electrode or a signal line. The second area AL may substantially correspond to the active area AL (or a channel) of a transistor 100PC. In other words, a portion AL of the semiconductor patterns SC, AL, DR, and SCL may be the active area AL of a transistor 100PC; other parts SC and DR may be the source area SC or the drain area DR of the transistor 100PC; and the other part SCL may be a connection electrode or a connection signal line SCL.

Each of pixels may include a plurality of transistors, at least one capacitor, and at least one light emitting element, and the equivalent circuit of the pixel may be modified in various forms. FIG. 6A shows the one transistor 100PC and one light emitting element 100PE included in a pixel.

The source area SC, the active area AL, and the drain area DR of the transistor 100PC may be formed of the semiconductor patterns SC, AL, DR, and SCL. The source area SC and the drain area DR may extend in directions opposite to each other from the active area AL in a cross-sectional view. A portion of the connection signal line SCL formed of the semiconductor patterns SC, AL, DR, and SCL is illustrated in FIG. 6A. Although not separately illustrated, the connection signal line SCL may be connected to the drain area DR of the transistor 100PC in a plan view.

A first insulating layer 10 may be disposed on the buffer layer BFL. The first insulating layer 10 may overlap a plurality of pixels in common and may cover the semiconductor patterns SC, AL, DR, and SCL. The first insulating layer 10 may be an inorganic layer and/or an organic layer, and may have a single layer or multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a silicon oxide layer having a single layer structure. Not only the first insulating layer 10 but also an insulating layer of the circuit layer 120 to be described later may be an inorganic layer and/or an organic layer, and may have a single layer structure or a multi-layer structure. The inorganic layer may include at least one of the above-described materials, but is not limited thereto.

A gate GT of the transistor 100PC is disposed on the first insulating layer 10. The gate GT may be a part of a metal pattern. The gate GT overlaps the active area AL. The gate GT may function as a mask in a process of doping and/or reducing the semiconductor patterns SC, AL, DR, and SCL.

A second insulating layer 20 is disposed on the first insulating layer 10 and may cover the gate GT. The second insulating layer 20 may overlap pixels in common. The second insulating layer 20 may be an inorganic layer and/or an organic layer, and may have a single layer structure or a multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single layer structure or a multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 formed through the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 formed through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. Hereinafter, the description will be given under the condition that the light emitting element 100PE is an organic light emitting element, but an embodiment is not particularly limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 formed through the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least part of the first electrode AE.

The first display part DA1-F (see FIG. 1A) may include an emission area PXA and a non-emission area NPXA disposed adjacent to the emission area PXA. The non-emission area NPXA may surround the emission area PXA. In an embodiment, the emission area PXA is defined to correspond to a partial area of the first electrode AE which is exposed by the opening 70-OP.

The light emitting layer EL may be disposed on the first electrode AE. The light emitting layer EL may be disposed in an area corresponding to the opening 70-OP. FIG. 6A shows an example of the light emitting layer EL disposed within the opening 70-OP, but the arrangement is not particularly limited thereto. For example, the light emitting layer EL may extend to cover a portion of a side surface of the pixel defining layer 70 defining the opening 70-OP and a top surface of the pixel defining layer 70.

In an embodiment of the present disclosure, the light emitting layer EL may be separately formed on each of pixels. When the light emitting layers EL are separately formed in each of pixels, each of the light emitting layers EL may emit light of at least one of a blue color, a red color, and a green color. However, an embodiment is not limited thereto. For example, the light emitting layer EL may be connected and included in each of the pixels in common. In this case, the light emitting layer EL may provide blue light or white light.

The second electrode CE may be disposed on the light emitting layer EL. The second electrode CE may be included in a plurality of pixels in common while having an integral shape.

In an embodiment of the present disclosure, a hole control layer may be interposed between the first electrode AE and the light emitting layer EL. The hole control layer may be disposed in common in the emission area PXA and the non-emission area NPXA. The hole control layer may include a hole transport layer and may further include a hole injection layer. An electron control layer may be interposed between the light emitting layer EL and the second electrode CE. The electron control layer may include an electron transport layer, and may further include an electron injection layer. The hole control layer and the electron control layer may be formed in common in a plurality of pixels by using an open mask or inkjet process.

The encapsulation layer 140 may be disposed on the light emitting element layer 130. The encapsulation layer 140 may include an inorganic layer, an organic layer, and an inorganic layer sequentially stacked, and layers constituting the encapsulation layer 140 are not limited thereto. The inorganic layers may protect the light emitting element layer 130 from moisture and oxygen, and the organic layer may protect the light emitting element layer 130 from a foreign material such as dust particles. The inorganic layers may include a silicon nitride layer, a silicon oxynitride layer, a silicon oxide layer, a titanium oxide layer, an aluminum oxide layer, or the like. The organic layer may include, but is not limited to, an acrylic-based organic layer.

The sensor layer 200 may include a base layer 201, a first conductive layer 202, an intermediate insulating layer 203, a second conductive layer 204, and a cover insulating layer 205.

The base layer 201 may be an inorganic layer including at least one of silicon nitride, silicon oxynitride, and silicon oxide. Alternatively, the base layer 201 may be an organic layer including an epoxy resin, an acrylate resin, or an imide-based resin. The base layer 201 may have a single layer structure or may have a multi-layer structure stacked in the third direction DR3. In an embodiment of the present disclosure, the sensor layer 200 may not include the base layer 201.

Each of the first conductive layer 202 and the second conductive layer 204 may have a single layer structure or may have a multi-layer structure in which layers are stacked in the third direction DR3.

Each of the first conductive layer 202 and the second conductive layer 204 of a single layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), indium zinc tin oxide (IZTO), or the like. Besides, the transparent conductive layer may include a conductive polymer such as poly(3,4-ethylenedioxythiophene) (PEDOT), a metal nano wire, graphene, and the like.

Each of the first conductive layer 202 and the second conductive layer 204 of the multi-layer structure may include metal layers. For example, the metal layers may have a three-layer structure of titanium/aluminum/titanium. The conductive layer of the multi-layer structure may include at least one metal layer and at least one transparent conductive layer.

In an embodiment of the present disclosure, the thickness of the first conductive layer 202 may be greater than or equal to the thickness of the second conductive layer 204. When the thickness of the first conductive layer 202 is greater than the thickness of the second conductive layer 204, the resistance of a component (e.g., an electrode, a sensing pattern, or a bridge pattern) included in the first conductive layer 202 may be reduced. Moreover, because the first conductive layer 202 is disposed under the second conductive layer 204, the probability that components included in the first conductive layer 202 are to be recognized by external light reflection may be lower than that of the second conductive layer 204, even though the thickness of the first conductive layer 202 is increased.

At least one of the intermediate insulating layer 203 and the cover insulating layer 205 may include an inorganic film. The inorganic film may include at least one of aluminum oxide, titanium oxide, silicon oxide, silicon nitride, silicon oxynitride, zirconium oxide, and hafnium oxide.

At least one of the intermediate insulating layer 203 and the cover insulating layer 205 may include an organic film. The organic film may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, and perylene-based resin.

Previously, the description will be given under the condition that the sensor layer 200 includes a total of two conductive layers (i.e., the first conductive layer 202 and the second conductive layer 204), but an embodiment is not particularly limited thereto. For example, the sensor layer 200 may include three or more conductive layers.

Figure 6B:
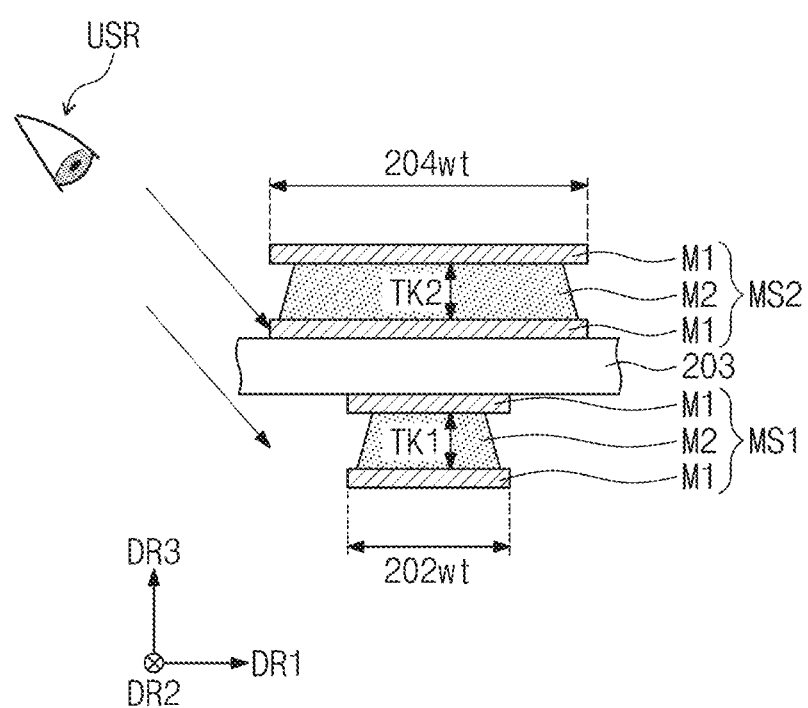
FIG. 6B is a cross-sectional view of a sensor layer according to an embodiment of the present disclosure

FIG. 6B is a cross-sectional view of the sensor layer 200, according to an embodiment of the present disclosure Referring to FIGS. 6A and 6B, a second width 204wt of a second mesh line MS2 included in the second conductive layer 204 may be greater than or equal to a first width 202wt of a first mesh line MS1 included in the first conductive layer 202. When a user USR watches the first mesh line MS1 and the second mesh line MS2 from a side, the first mesh line MS1 has a smaller width than the second mesh line MS2, and thus the probability that the first mesh line MS1 is to be recognized by the user USR may be reduced.

Each of the first mesh line MS1 and the second mesh line MS2 may include first metal layers M1 and a second metal layer M2 interposed between the first metal layers M1. The first metal layers M1 may include titanium (Ti), and the second metal layer M2 may include aluminum (Al). However, this is only an example and is not particularly limited thereto.

In an embodiment of the present disclosure, the first thickness TK1 of the second metal layer M2 of the first mesh line MS1 and the second thickness TK2 of the second metal layer M2 of the second mesh line MS2 may be substantially the same as each other, but the thicknesses of the second metal layer M2 are not particularly limited thereto. For example, the first thickness TK1 may be thicker than the second thickness TK2. Alternatively, the second thickness TK2 may be thicker than the first thickness TK1. In an embodiment of the present disclosure, each of the first thickness TK1 and the second thickness TK2 may be 1000 Ångström (Å) or more, and for example, 6000 Å.

Figure 7:
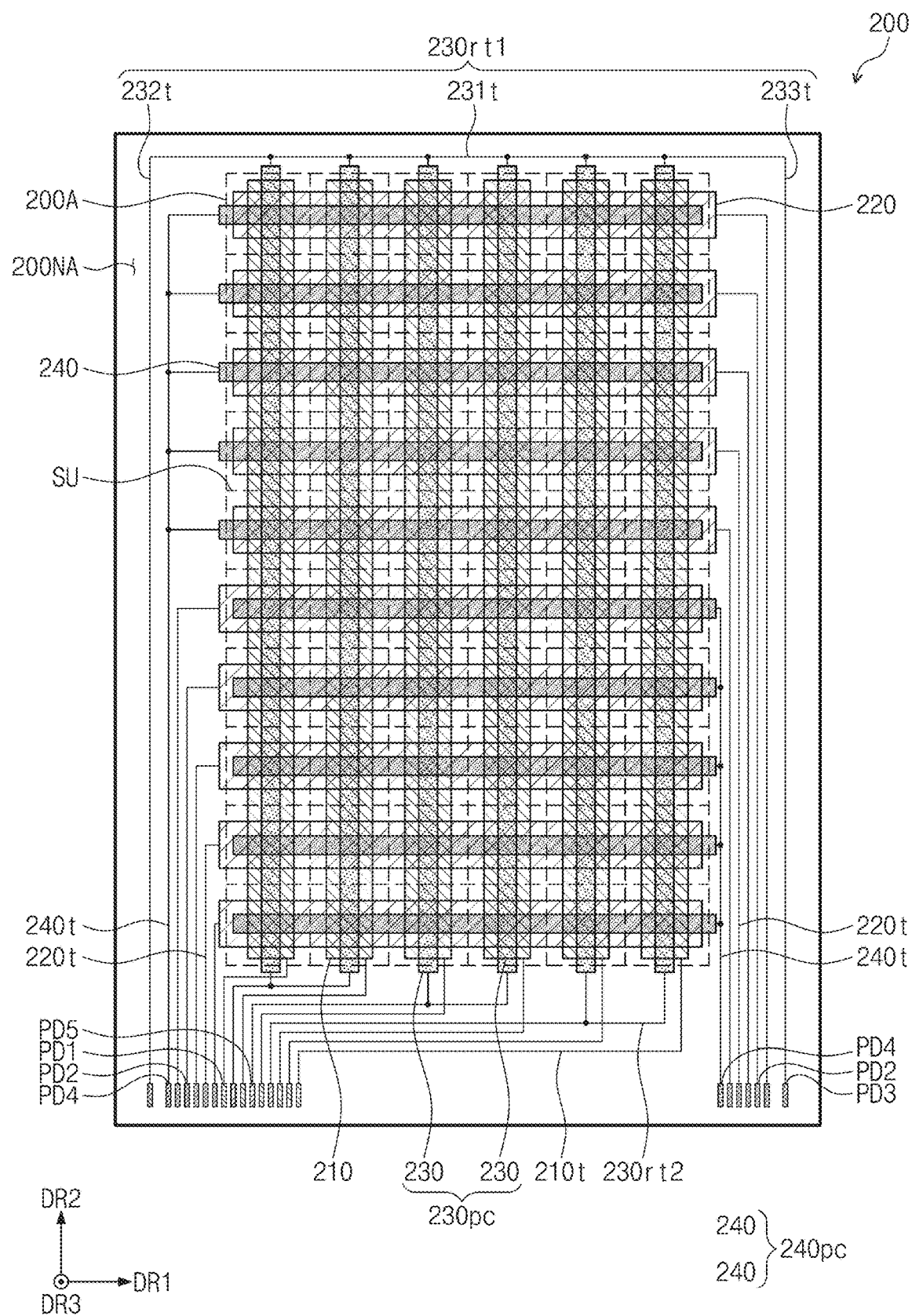
FIG. 7 is a plan view of a sensor layer according to an embodiment of the present disclosure.

FIG. 7 is a plan view of the sensor layer 200 according to an embodiment of the present disclosure.

Referring to FIG. 7, a sensing area 200A and a peripheral area 200NA disposed adjacent to the sensing area 200A may be defined in the sensor layer 200.

The sensor layer 200 may include a plurality of first electrodes 210, a plurality of second electrodes 220, a plurality of first auxiliary electrodes 230, and a plurality of second auxiliary electrodes 240 which are disposed in the sensing area 200A.

The first electrodes 210 may intersect the second electrodes 220. Each of the first electrodes 210 may extend in the second direction DR2. The first electrodes 210 may be arranged to be spaced apart from each other in the first direction DR1. Each of the second electrodes 220 may extend in the first direction DR1. The second electrodes 220 may be arranged to be spaced apart from each other in the second direction DR2. The sensing unit SU of the sensor layer 200 may be an area where the one first electrode 210 intersects the one second electrode 220.

FIG. 7 illustrates the six first electrodes 210, the ten second electrodes 220, and the 60 sensing units SU. However, the number of first electrodes 210 and the number of second electrodes 220 are not limited thereto.

Each of the first auxiliary electrodes 230 may extend in the second direction DR2. The first auxiliary electrodes 230 may be arranged to be spaced apart from each other in the first direction DR1. One first auxiliary electrode 230 may at least partially overlap one first electrode 210. According to an embodiment of the present disclosure, the capacitance (or coupling capacitance) between one first electrode 210 and one first auxiliary electrode 230 may be adjusted by adjusting the overlapping area of the one first electrode 210 and the one first auxiliary electrode 230.

In an embodiment of the present disclosure, at least some of the first auxiliary electrodes 230 may be connected in parallel with each other. For example, FIG. 7 shows the two first auxiliary electrodes 230 connected in parallel with each other to form a first auxiliary electrode group 230pc. The three first auxiliary electrode groups 230pc may be arranged in the first direction DR1. However, the number of the first auxiliary electrodes 230 constituting the first auxiliary electrode group 230pc is not limited thereto. For example, the one first auxiliary electrode group 230pc may include only one first auxiliary electrode 230, or may include three or more first auxiliary electrodes 230.

As the number of first auxiliary electrodes 230 included in the first auxiliary electrode group 230pc and connected in parallel with each other increases, the resistance of the first auxiliary electrode group 230pc is lowered, thereby improving power efficiency and sensing sensitivity. On the other hand, as the number of first auxiliary electrodes 230 included in the first auxiliary electrode group 230pc decreases, the loop coil pattern formed by using the first auxiliary electrode group of 230pc may be implemented in more diverse forms.

The second auxiliary electrodes 240 may be arranged in the second direction DR2, and the second auxiliary electrodes 240 may extend in the first direction DR1. One second auxiliary electrode 240 may at least partially overlap one second electrode 220. According to an embodiment of the present disclosure, the capacitance (or coupling capacitance) between one second electrode 220 and one second auxiliary electrode 240 may be adjusted by adjusting the overlapping area of one second electrode 220 and one second auxiliary electrode 240.

In an embodiment of the present disclosure, at least some of the second auxiliary electrodes 240 may be electrically connected to each other to form one second auxiliary electrode group 240pc. For example, FIG. 7 shows that the five second auxiliary electrodes 240 are connected to the same trace line (e.g., a fourth trace line 240t) to form the one second auxiliary electrode group 240pc. Accordingly, FIG. 7 shows that the two second auxiliary electrode groups 240pc are arranged in the second direction DR2. However, the number of second auxiliary electrodes 240 constituting the one second auxiliary electrode group 240pc is not limited thereto. For example, the number of second auxiliary electrodes 240 constituting the one second auxiliary electrode group 240pc may be 10. In this case, the sensor layer 200 may include only the one second auxiliary electrode group 240pc.

The sensor layer 200 may further include a plurality of first trace lines 210t disposed in the peripheral area 200NA, a plurality of first pads PD1 connected to the first trace lines 210t in a one-to-one correspondence, a plurality of second trace lines 220t, and a plurality of second pads PD2 connected to the second trace lines 220t in a one-to-one correspondence. The first trace lines 210t may be electrically connected to the first electrodes 210 in a one-to-one correspondence. The second trace lines 220t may be electrically connected to the second electrodes 220 in a one-to-one correspondence.

The sensor layer 200 may further include a third trace line 230rt1 disposed in the peripheral area 200NA, a plurality of third pads PD3 connected to one end and the other end of the third trace line 230rt1, fourth trace lines 240t, fourth pads PD4 connected to the fourth trace lines 240t in a one-to-one correspondence, fifth trace lines 230rt2, and a fifth pad PD5 connected to the fifth trace lines 230rt2 in a one-to-one correspondence.

The third trace line 230rt1 may be electrically connected to the first auxiliary electrodes 230. In an embodiment of the present disclosure, the third trace line 230rt1 may be electrically connected to all of the first auxiliary electrodes 230. The third trace line 230rt1 may include a first line portion 231t extending in the first direction DR1 and electrically connected to the first auxiliary electrodes 230, a second line portion 232t extending from a first end of the first line portion 231t in the second direction DR2, and a third line portion 233t extending from a second end of the first line portion 231t in the second direction DR2.

In an embodiment of the present disclosure, each of the resistance of the second line portion 232t and the resistance of the third line portion 233t may be substantially the same as the resistance of one first auxiliary electrode among the first auxiliary electrodes 230. Accordingly, the second line portion 232t and the third line portion 233t may serve as the first auxiliary electrodes 230, and the same effect that the first auxiliary electrodes 230 are also placed in the peripheral area 200NA may be obtained. For example, one of the second line portion 232t and the third line portion 233t and one of the first auxiliary electrodes 230 may form a coil. Accordingly, a pen located in an area adjacent to the peripheral area 200NA may also be sufficiently charged by a loop including the second line portion 232t or the third line portion 233t.

In an embodiment of the present disclosure, to adjust the resistance of each of the second line portion 232t and the third line portion 233t, the width of each of the second line portion 232t and the third line portion 233t in the first direction DR1 may be adjusted. However, this is only an example, and the first to third line portions 231t, 232t, and 233t may have substantially the same width as each other.

The fifth trace lines 230rt2 may be connected to the first auxiliary electrode groups 230pc in a one-to-one correspondence. That is, the number of fifth trace lines 230rt2 may correspond to the number of first auxiliary electrode groups 230pc. FIG. 7 shows the three fifth trace lines 230rt2 and the three first auxiliary electrode groups 230pc.

The fourth trace lines 240t may be spaced apart from each other with the sensing area 200A disposed therebetween. The fourth trace lines 240t may be electrically connected to the second auxiliary electrode groups 240pc in a one-to-one correspondence. FIG. 7 shows that the two second auxiliary electrode groups 240pc are arranged as an example. The fourth trace line 240t connected to the one second auxiliary electrode group 240pc, and the fourth trace line 240t connected to the other second auxiliary electrode group 240pc may be spaced apart from each other with the sensing area 200A disposed therebetween. However, an embodiment is not particularly limited thereto.

Figure 8:
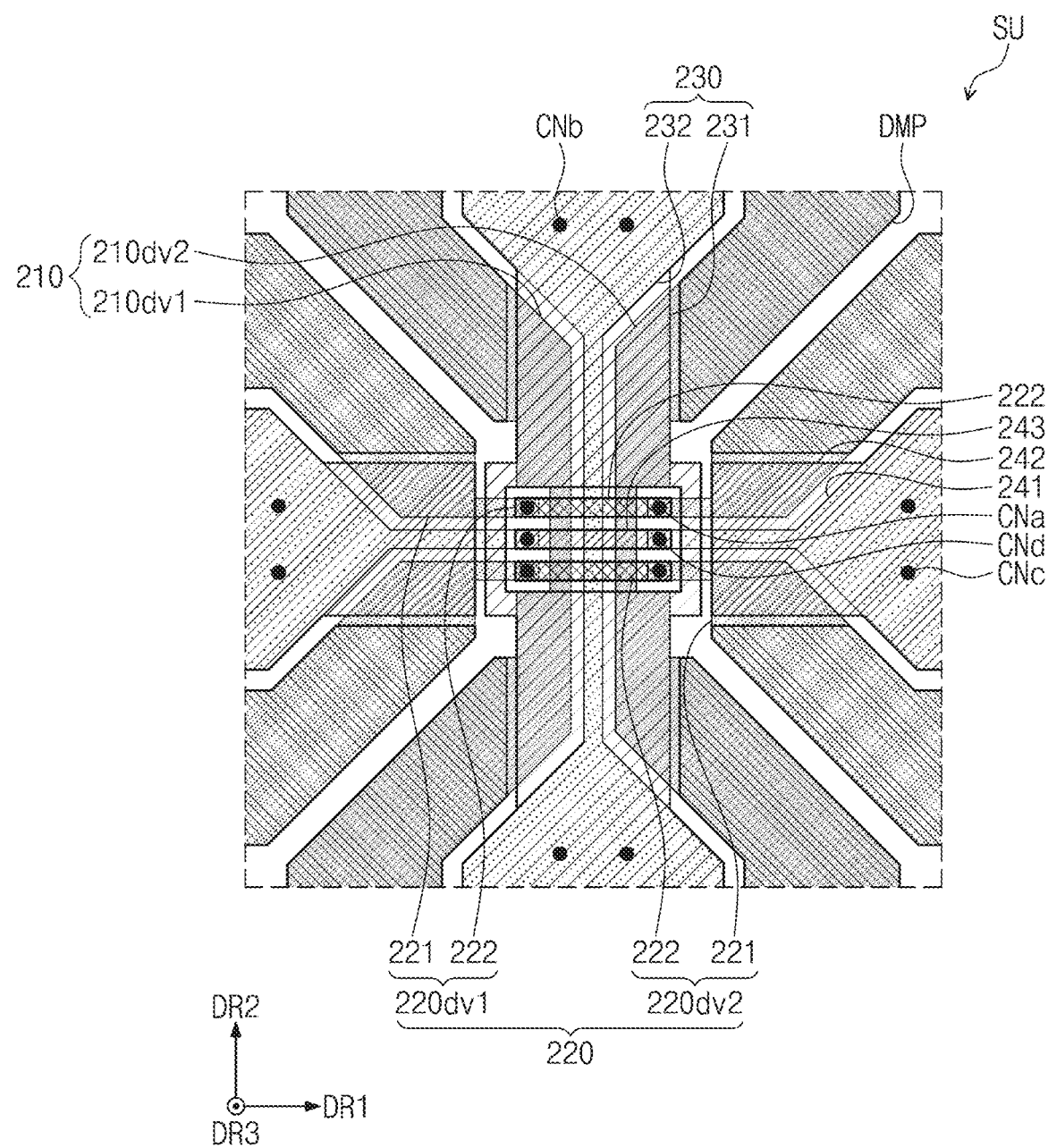
FIG. 8 is an enlarged plan view of one sensing unit according to an embodiment of the present disclosure.
Figure 9A:
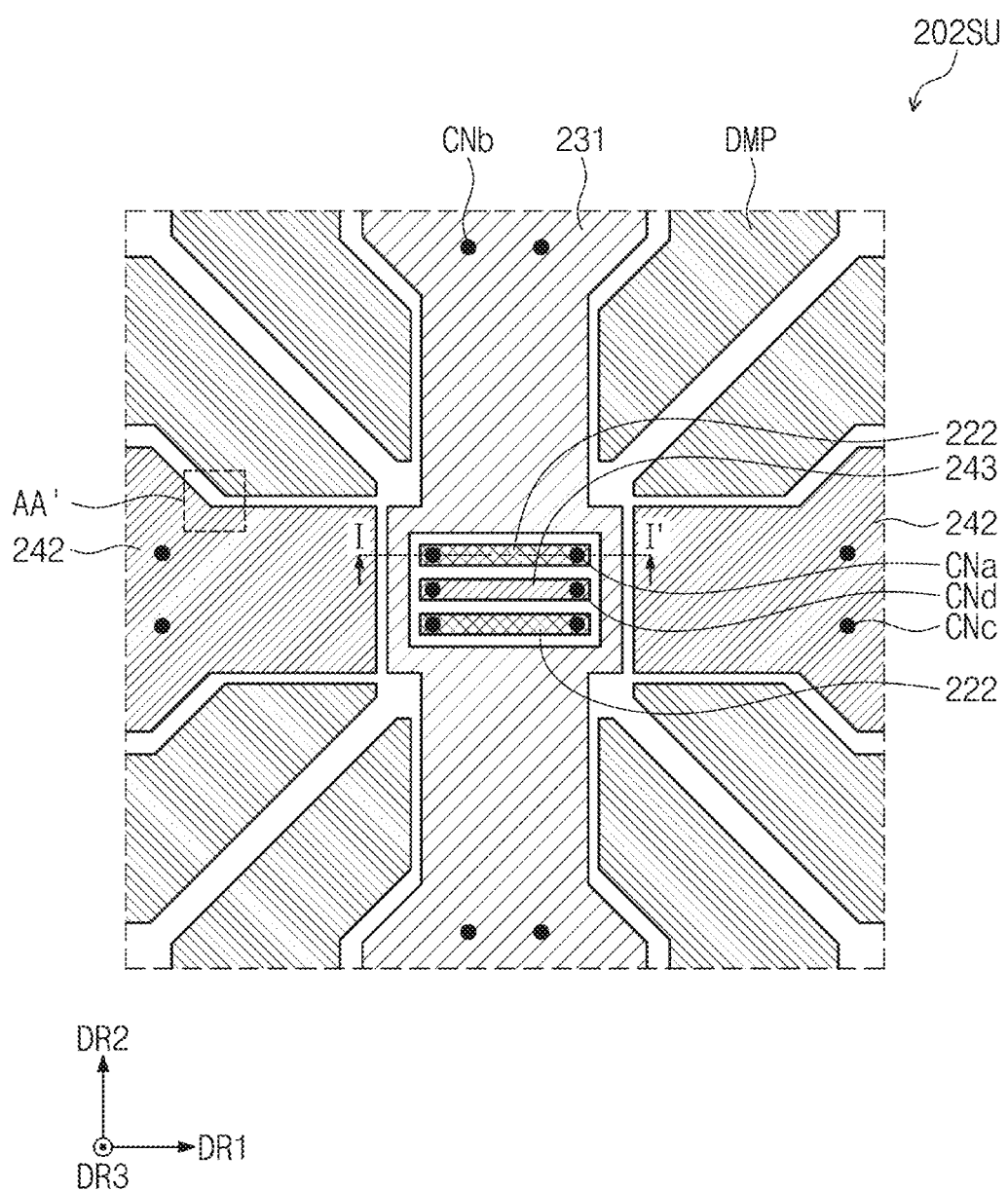
FIG. 9A is a plan view showing a first conductive layer of a sensing unit according to an embodiment of the present disclosure.
Figure 9B:
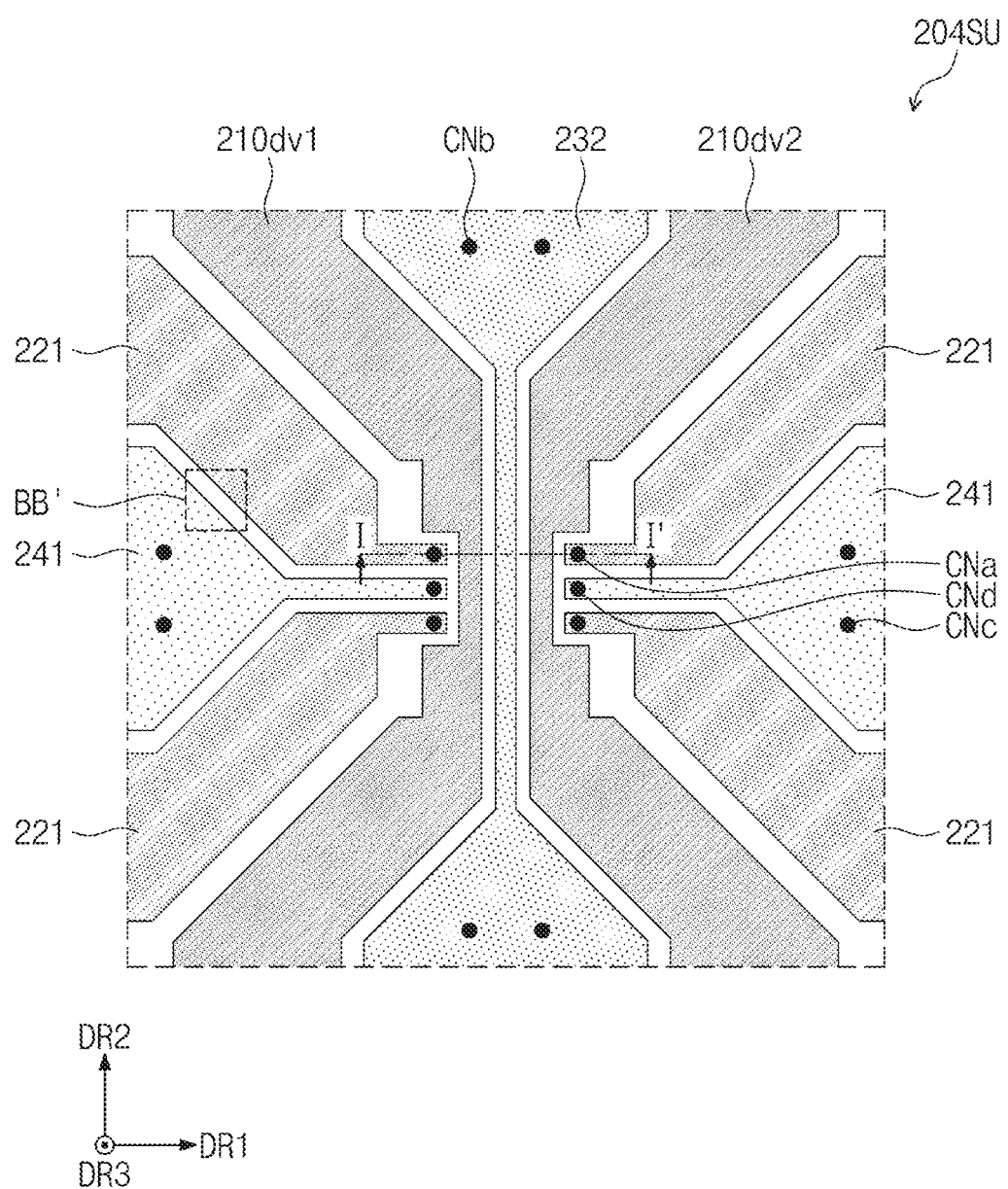
FIG. 9B is a plan view showing a second conductive layer of a sensing unit according to an embodiment of the present disclosure.
Figure 10:
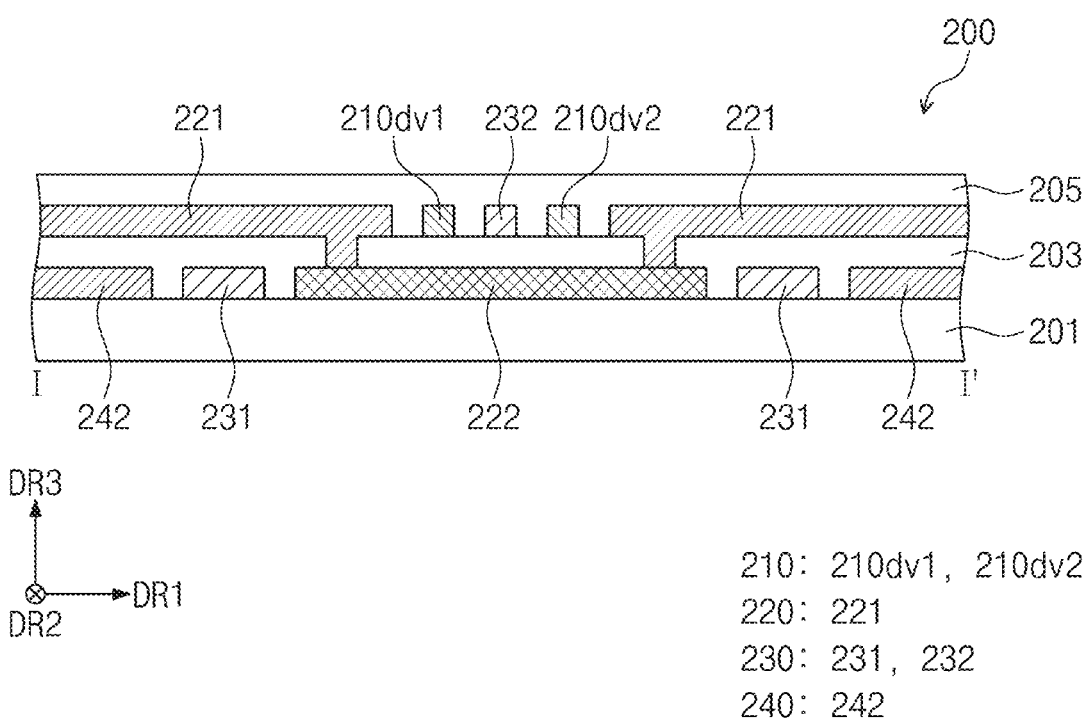
FIG. 10 is a cross-sectional view of a sensor layer taken along line I-I' shown in FIGS. 9A and 9B according to an embodiment of the present disclosure.

FIG. 8 is an enlarged plan view of one sensing unit SU according to an embodiment of the present disclosure. FIG. 9A is a plan view showing a first conductive layer 202SU of the sensing unit SU according to an embodiment of the present disclosure. FIG. 9B is a plan view showing a second conductive layer 204SU of the sensing unit SU according to an embodiment of the present disclosure. FIG. 10 is a cross-sectional view of the sensor layer 200 taken along line I-I' shown in FIGS. 9A and 9B according to an embodiment of the present disclosure.

Referring to FIGS. 7 and 8, each of the first electrodes 210 may include first unit division electrodes 210dv1 and 210dv2. The first unit division electrodes 210dv1 and 210dv2 may extend in the second direction DR2 and may be spaced apart from each other in the first direction DR1. The first unit division electrodes 210dv1 and 210dv2 may have a line-symmetrical shape with respect to a line extending in the second direction DR2.

Each of the second electrodes 220 may include the second unit division electrodes 220dv1 and 220dv2. The second unit division electrodes 220dv1 and 220dv2 may extend in the first direction DR1 and may be spaced apart from each other in the second direction DR2. The second unit division electrodes 220dv1 and 220dv2 may have a line-symmetrical shape with respect to a line extending in the first direction DR1.

Referring to FIGS. 8, 9A, 9B, and 10, each of the second unit division electrodes 220dv1 and 220dv2 may include a sensing pattern 221 and a bridge pattern 222. The sensing pattern 221 and the bridge pattern 222 may be disposed on different layers, and the sensing pattern 221 and the bridge pattern 222 may be electrically connected to each other through a first contact CNa. For example, the bridge pattern 222 may be included in a first conductive layer 202SU. The sensing pattern 221 and the first unit division electrodes 210dv1 and 210dv2 may be included in a second conductive layer 204SU. The first conductive layer 202SU may be included in the first conductive layer 202 of FIG. 6A, and the second conductive layer 204SU may be included in the second conductive layer 204 of FIG. 6A.

Referring to FIGS. 7, 9A, and 9B, each of the first auxiliary electrodes 230 may include a 3-1st pattern 231 and a 3-2nd pattern 232. The 3-1st pattern 231 and the 3-2nd pattern 232 may be disposed on different layers. The 3-1st pattern 231 and the 3-2nd pattern 232 may be electrically connected to each other through a second contact CNb. The 3-1st pattern 231 may be included in the first conductive layer 202SU. The 3-2nd pattern 232 may be included in the second conductive layer 204SU.

In an embodiment of the present disclosure, a part of the 3-1st pattern 231 may overlap a part of each of the first unit division electrodes 210dv1 and 210dv2. Accordingly, coupling capacitance may be formed between the first electrode 210 and the first auxiliary electrode 230.

Referring to FIGS. 7, 9A, and 9B, each of the second auxiliary electrodes 240s1 or 240s2 may include a 4-1st pattern 241, a 4-2nd pattern 242, and a 4-3rd pattern 243. The 4-2nd pattern 242 and the 4-3rd pattern 243 may be disposed on the same layer as each other. The 4-1st pattern 241 may be placed on a different layer from the 4-2nd pattern 242 and the 4-3rd pattern 243. The 4-1st pattern 241 and the 4-2nd pattern 242 may be electrically connected to each other through a third contact CNc. The 4-1st pattern 241 and the 4-3rd pattern 243 may be electrically connected to each other through a fourth contact CNd. The 4-2nd pattern 242, and the 4-3rd pattern 243 may be included in the first conductive layer 202SU, and the 4-1st pattern 241 may be included in the second conductive layer 204SU.

In an embodiment of the present disclosure, a part of the 4-2nd pattern 242 may overlap the sensing pattern 221 of each of the second unit division electrodes 220dv1 and 220dv2. Accordingly, coupling capacitor may be formed between the second electrode 220 and the second auxiliary electrode 240.

In an embodiment of the present disclosure, the first conductive layer 202SU may further include dummy patterns DMP. Each of the dummy patterns DMP may be electrically floated or electrically grounded. In an embodiment of the present disclosure, the dummy patterns DMP may be omitted. Because the dummy patterns DMP are disposed in the empty space, the probability that a specific pattern is visually perceived due to external light reflection may be reduced. In other words, the electronic device 1000 (see FIG. 1A) with improved visibility may be provided by reducing external light reflection.

Referring to FIGS. 9A and 9B, the area occupied by components included in the first electrode 210 and the second electrode 220 in the second conductive layer 204SU of one of the sensing unit SU may be greater than the area occupied by components included in the first auxiliary electrode 230 and the second auxiliary electrode 240. A change in capacitance due to the first input 2000 (see FIG. 5) may be greater as a distance becomes shorter. Accordingly, components for sensing the first input 2000 (see FIG. 5) may be arranged in a layer adjacent to the surface of the electronic device 1000 (see FIG. 1A) to have a relatively great area. As a result, touch performance may be improved.

Previously, FIGS. 7 to 10 show a structure in which the first electrode 210, the second electrode 220, the first auxiliary electrode 230, and the second auxiliary electrode 240 are disposed in two conductive layers 202SU and 204SU. An embodiment is not particularly limited thereto. For example, the first electrode 210, the second electrode 220, the first auxiliary electrode 230, and the second auxiliary electrode 240 may be disposed in three conductive layers or four conductive layers.

In an embodiment of the present disclosure, the first auxiliary electrodes 230, to which a signal is applied in a charging driving mode, may be included in the third conductive layer (not shown) disposed under the first and second conductive layers 202SU and 204SU. For example, a third conductive layer may be provided below the base layer 201. The third conductive layer may be interposed between the base layer 201 and the display layer 100, may be disposed under the display layer 100, or may be included within the display layer 100.

The first electrodes 210, the second electrodes 220, and the second auxiliary electrodes 240 may be disposed in the first and second conductive layers 202SU and 204SU. For example, when the first auxiliary electrodes 230 is implemented as a separate conductive layer such as the third conductive layer, the shape of the first auxiliary electrodes 230 may be designed more freely. For example, the first auxiliary electrodes 230 may be provided in a form including a plurality of coils. Moreover, the first auxiliary electrodes 230 may be densely provided by using the third conductive layer. In this case, pen sensing sensitivity may be improved. In an embodiment of the present disclosure, the third conductive layer may include the second auxiliary electrodes 240 instead of the first auxiliary electrodes 230.

Figure 11A:
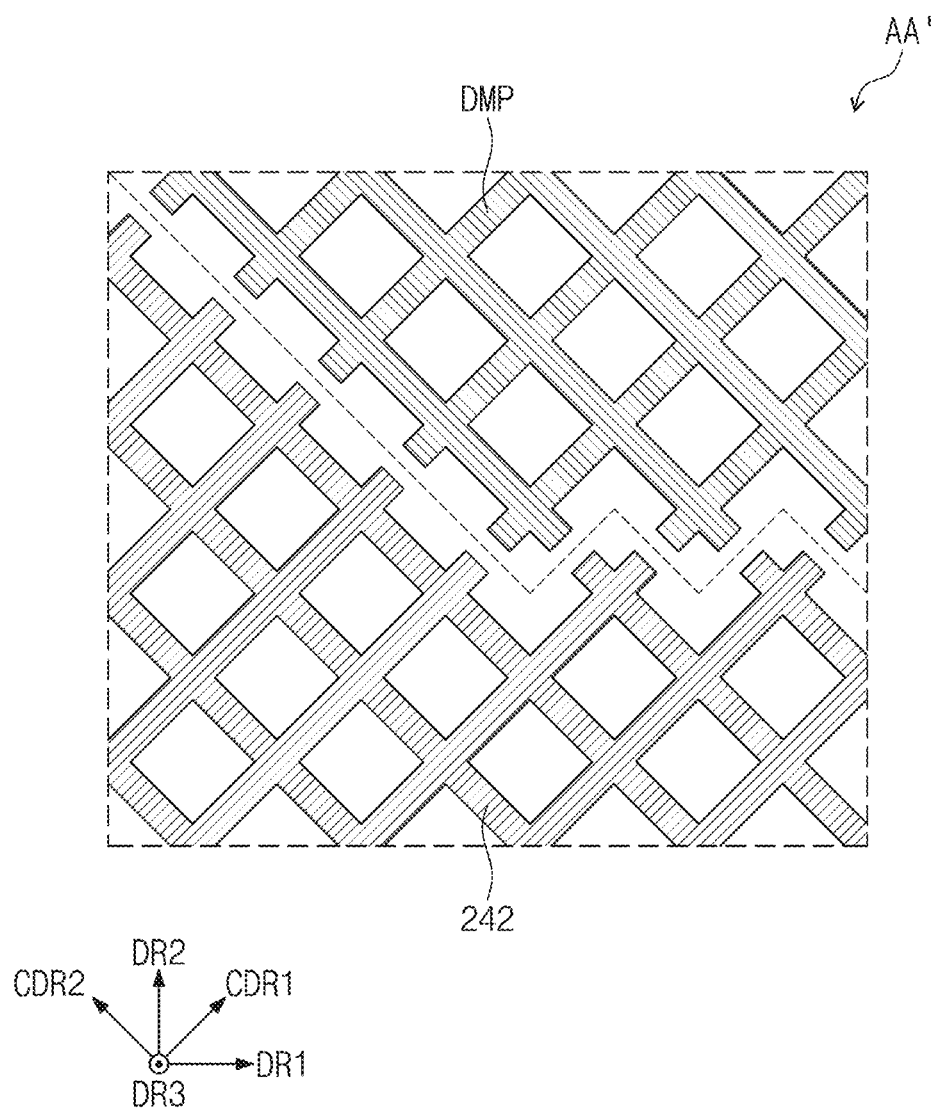
FIG. 11A is an enlarged plan view of area AA' shown in FIG. 9A.
Figure 11B:
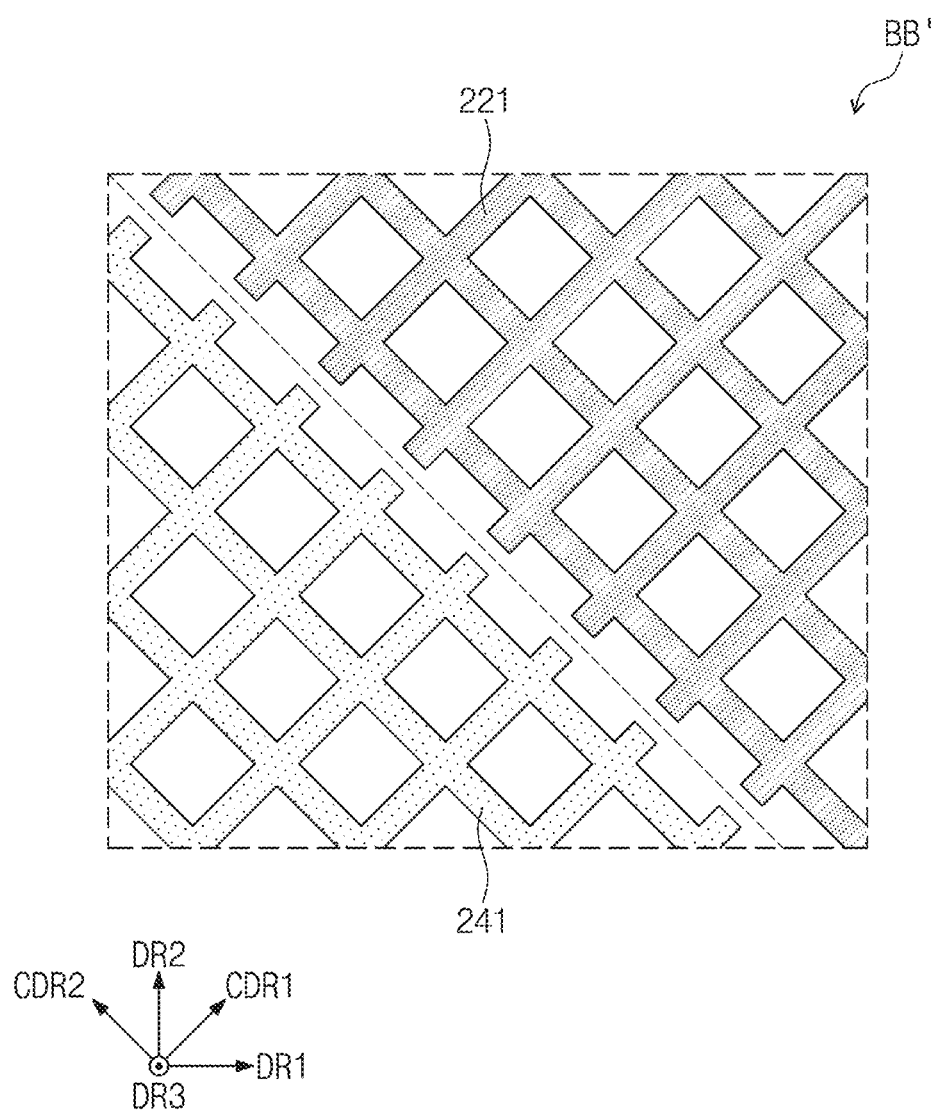
FIG. 11B is an enlarged plan view of area BB' shown in FIG. 9B.

FIG. 11A is an enlarged plan view of area AA' shown in FIG. 9A. FIG. 11B is an enlarged plan view of area BB' shown in FIG. 9B.

Referring to FIGS. 9A, 9B, 11A, and 11B, each of the first electrodes 210, the second electrodes 220, the first auxiliary electrodes 230, the second auxiliary electrodes 240, and the dummy patterns DMP may have a mesh structure. Each of the mesh structures may include a plurality of mesh lines. Each of the plurality of mesh lines may have a straight line shape extending in a predetermined direction and may be connected to each other. Openings in which no mesh structure is disposed may be defined (provided or formed) in each of the first electrodes 210, the second electrodes 220, the first auxiliary electrodes 230, the second auxiliary electrodes 240, and the dummy patterns DMP.

FIGS. 11A and 11B illustrate that the mesh structure includes mesh lines extending in a first cross direction CDR1 intersecting the first direction DR1 and the second direction DR2, and mesh lines extending in the second cross direction CDR2 intersecting the first cross direction CDR1. However, the extension direction of the mesh lines constituting the mesh structure is not particularly limited to the illustrations in FIGS. 11A and 11B. For example, the mesh structure may include only mesh lines extending in the first direction DR1 and the second direction DR2, or may include mesh lines extending in the first direction DR1, the second direction DR2, and the first cross direction CDR1 and the second cross direction CDR2. In other words, the mesh structure may be changed into various forms.

Figure 12A:
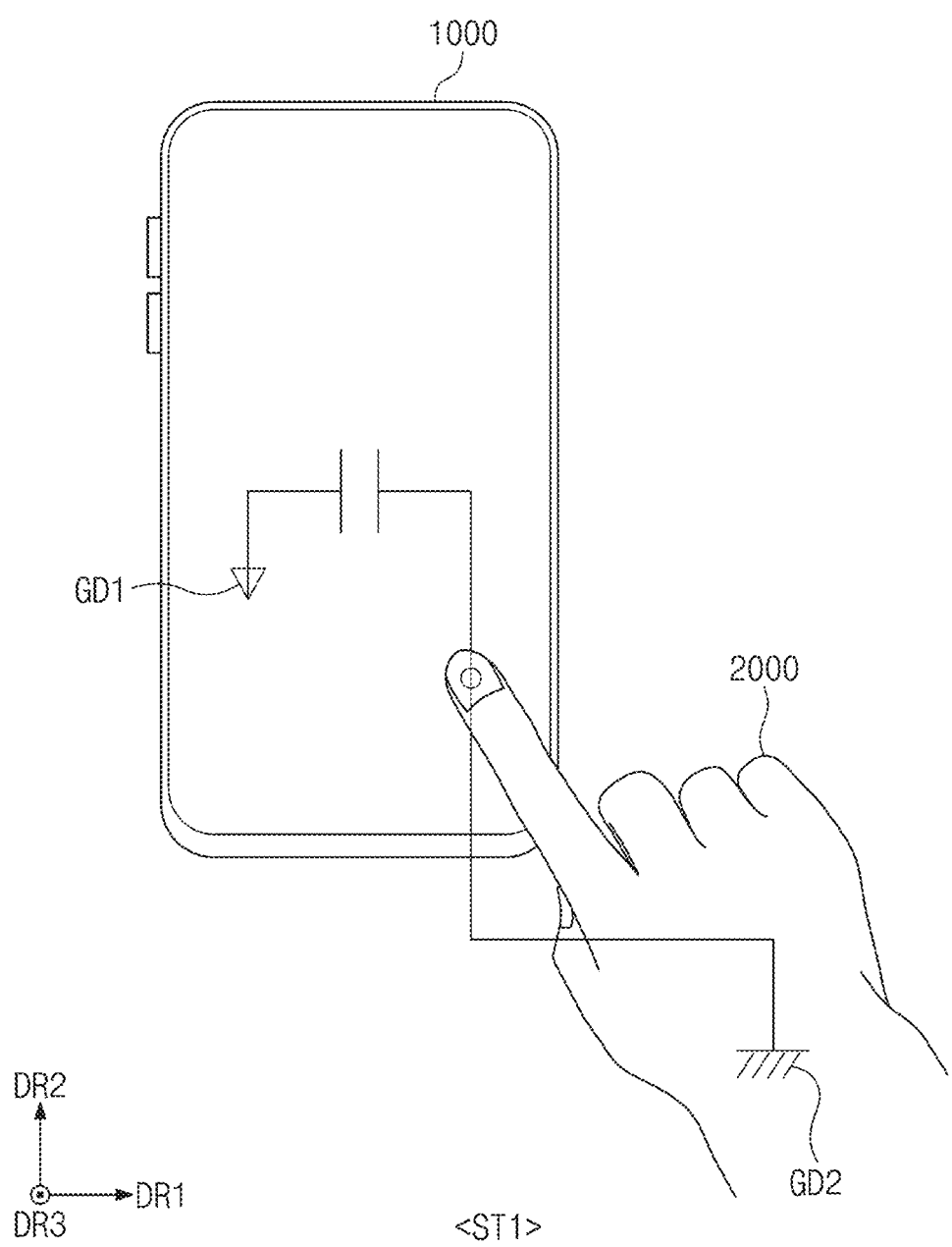
FIG. 12A is a diagram illustrating a use state of an electronic device according to an embodiment of the present disclosure.
Figure 12B:
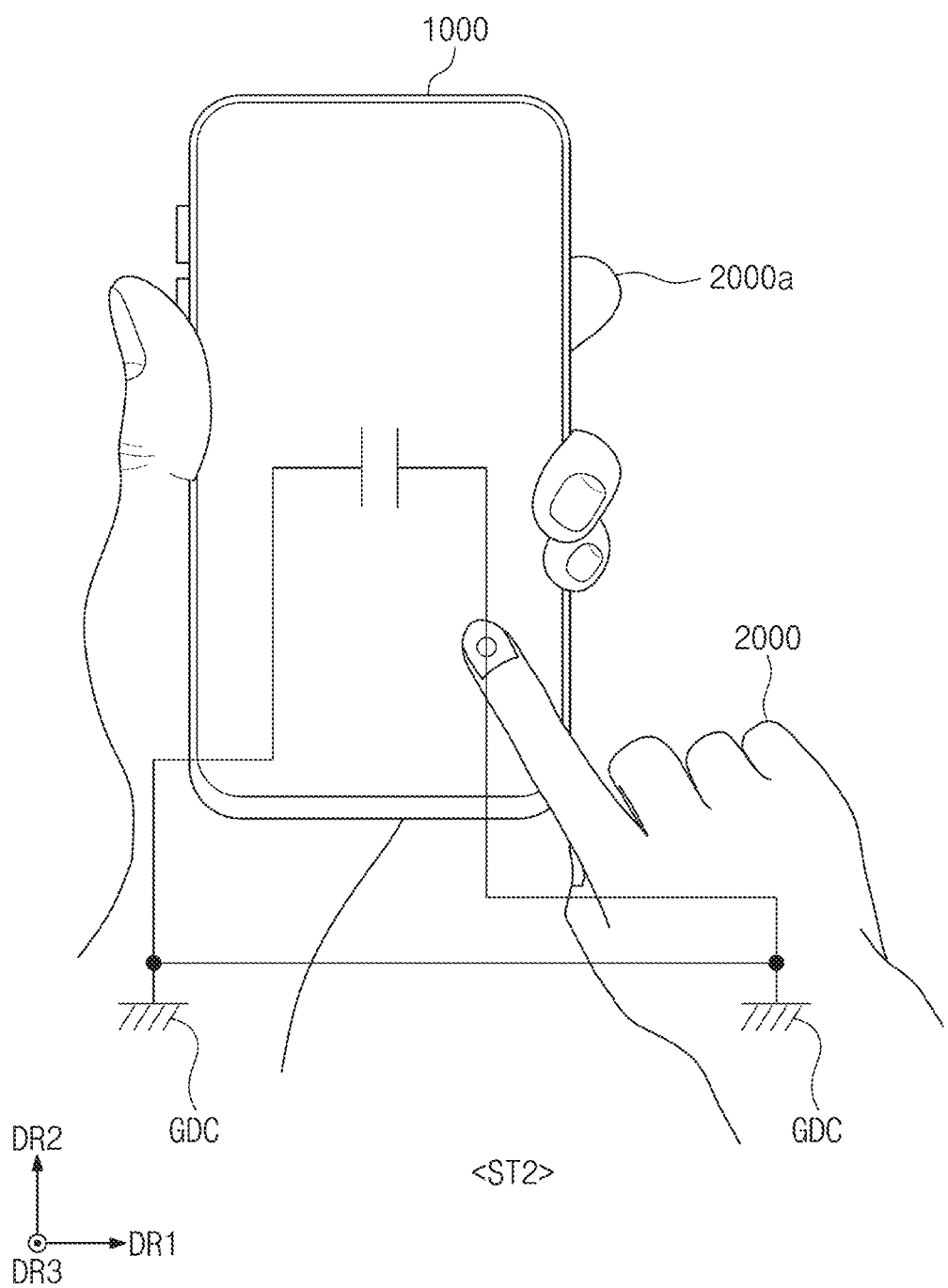
FIG. 12B is a diagram illustrating a use state of an electronic device according to an embodiment of the present disclosure.

FIG. 12A is a diagram illustrating a use state of an electronic device 1000 according to an embodiment of the present disclosure. FIG. 12B is a diagram illustrating a use state of an electronic device 1000, according to an embodiment of the present disclosure.

A first use state ST1 (or a first state) shown in FIG. 12A may be a state where the electronic device 1000 is touched with only one hand. The first use state ST1 may be a state where the electronic device 1000 is manipulated in a non-grip state (e.g., a state where the electronic device 1000 is positioned on a table). In this case, a ground GD1 of the electronic device 1000 and a ground GD2 of a user providing a first input 2000 may be separated from each other. The electronic device 1000 may not have a sufficient ground state in the first use state ST1.

A second use state ST2 (or a second state) shown in FIG. 12B may be a state where a user grips (2000a) the electronic device 1000 by one hand 2000a and provides the first input 2000 by the other hand 2000. FIG. 12B illustrates both hands are used in manipulating the electronic device 1000, but an embodiment is not limited thereto. For example, making the first input 2000 by using a finger from the gripped hand that is holding the electronic device 1000 with one hand may be considered to be in the second use state ST2. In this case, a ground GDC of the electronic device 1000 and the ground GDC of a user providing the first input 2000 may have a common ground state, and the electronic device 1000 and the user may be connected to the ground. Accordingly, the electronic device 1000 may have a sufficient ground state in the second use state ST2.

The first use state ST1 may result in a low ground mass (LGM) state. The second use state ST2 may result in a high ground mass (HGM) state.

Referring to FIGS. 7 and 12A, in a first mode for detecting the first input 2000, it may be determined the LGM state, by using auxiliary signals received through at least some of the first auxiliary electrodes 230 and the second auxiliary electrodes 240. In this case, distorted detection signals according to the LGM status may be compensated for. Accordingly, signal distortion in the LGM state may be reduced and coordinate accuracy may be improved.

Figure 13A:
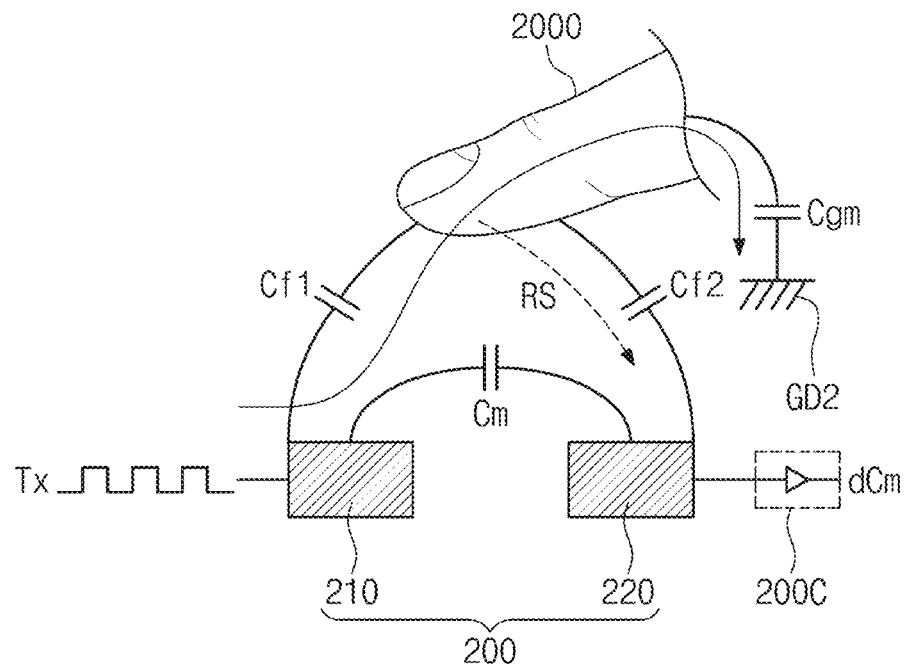
FIGS. 13A and 13B are diagrams for describing an operation of a sensor layer in an LGM state.
Figure 13B:
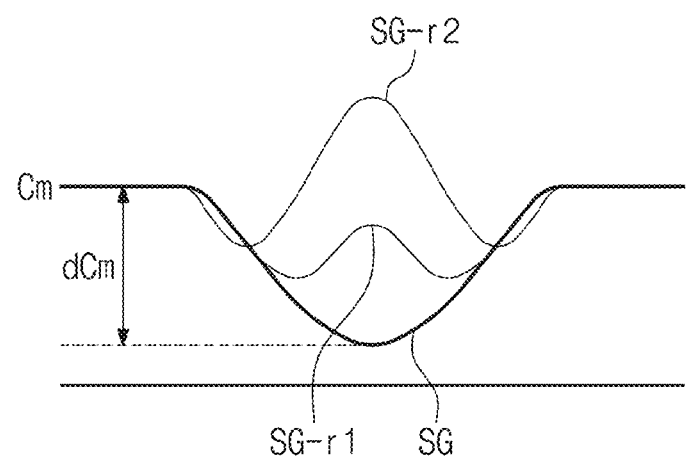

FIGS. 13A and 13B are diagrams for describing an operation of a sensor layer in an LGM state.

Referring to FIGS. 12A, 13A and 13B, mutual capacitance Cm may be formed (or generated) between the first electrode 210 and the second electrode 220; first touch capacitance Cf1 may be formed between the first electrode 210 and a finger providing the first input 2000 and second touch capacitance Cf2 may be formed between the second electrode 220 and the finger providing the first input 2000.

When the first input 2000 is provided, charges of the mutual capacitance Cm may move to a user's ground GD2 through a finger Cgm providing the first input 2000. The sensor driver 200C may calculate touch coordinates by detecting a change amount dCm of the mutual capacitance Cm.

The ground GD1 of the electronic device 1000 and the ground GD2 of the user providing the first input 2000 may be different from each other depending on a use state. For example, in the first use state ST1, some charges RS may flow back into the sensor layer 200 through the second touch capacitance Cf2. Compared to a signal SG obtained in the second use state ST2, the waveform of a signal SG-r1 or SG-r2 obtained in the first use state ST1 may have a waveform with an unclear peak.

The signal for detecting a change in capacitance in the first use state ST1 may become unstable or unclear. For example, depending on the contact area of the first input 2000 and/or a method of providing the first input 2000, the signal may have a waveform whose center (or peak) is concave. Referring to the sample of the signal SG-r1 or SG-r2 obtained in the first use state ST1, a signal peak is distributed to the periphery while the center of the signal is convex. In this case, each peak is mistakenly recognized as a separate signal, and thus the accuracy of touch coordinates may be reduced.

According to an embodiment of the present disclosure, the sensor driver 200C may receive an auxiliary signal through at least one of the first auxiliary electrodes 230 (see FIG. 7) and the second auxiliary electrodes 240 (see FIG. 7) when the first input 2000 is sensed. The sensor driver 200C may determine whether the sensor layer 200 is in the LGM state based on the auxiliary signal and may compensate for the signal received from the second electrodes 220. This will be more fully detailed later.

Figure 14:
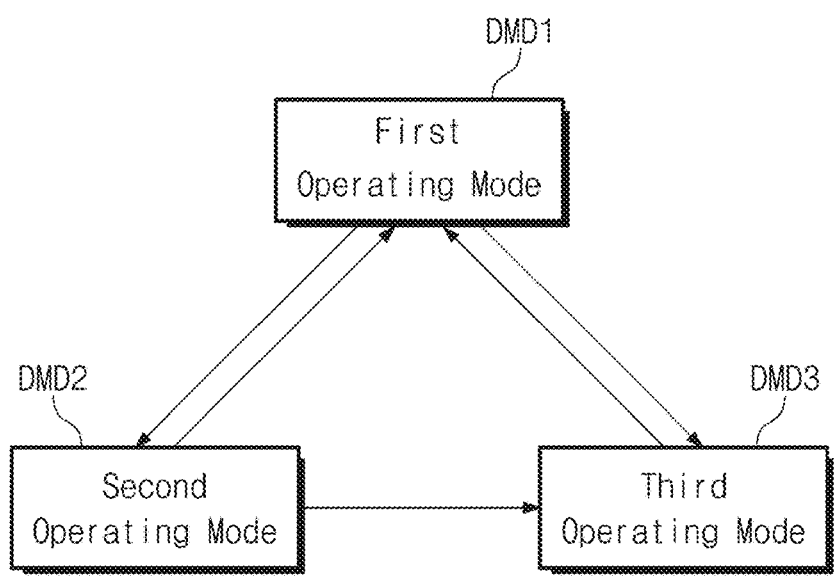
FIG. 14 is a diagram illustrating an operation of a sensor driver according to an embodiment of the present disclosure.
Figure 15:
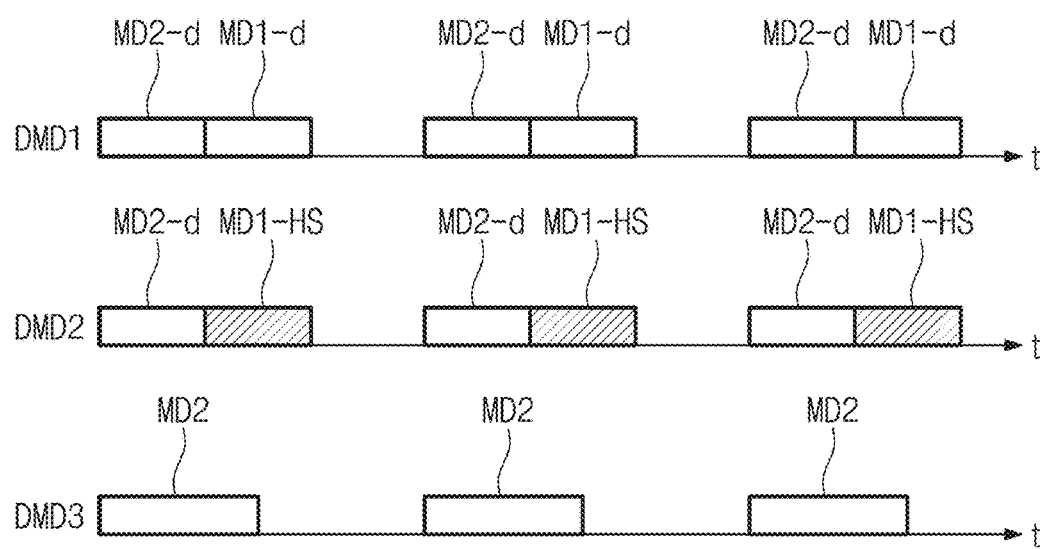
FIG. 15 is a diagram illustrating an operation of a sensor driver according to an embodiment of the present disclosure.

FIG. 14 is a diagram illustrating an operation of a sensor driver according to an embodiment of the present disclosure. FIG. 15 is a diagram illustrating an operation of a sensor driver according to an embodiment of the present disclosure.

Referring to FIGS. 5 and 14, the sensor driver 200C may be configured to selectively operate in one of a first operating mode DMD1, a second operating mode DMD2, and a third operating mode DMD3.

The first operating mode DMD1 may be referred to as a "touch and pen standby mode"; the second operating mode DMD2 may be referred to as a "touch activation and pen standby mode"; and, the third operating mode DMD3 may be referred to as a "pen activation mode". The first operating mode DMD1 may be a mode for waiting for the first input 2000 and the second input 3000. The second operating mode DMD2 may be a mode for sensing the first input 2000 and waiting for the second input 3000. The third operating mode DMD3 may be a mode for sensing the second input 3000.

In an embodiment of the present disclosure, the sensor driver 200C may be first driven in the first operating mode DMD1. When the first input 2000 is sensed in the first operating mode DMD1, the operating mode of the sensor driver 200C may be switched (or changed) to the second operating mode DMD2. Alternatively, when the second input 3000 is sensed in the first operating mode DMD1, the operating mode of the sensor driver 200C may be switched (or changed) to the third operating mode DMD3.

In an embodiment of the present disclosure, when the second input 3000 is sensed in the second operating mode DMD2, an operating mode of the sensor driver 200C may be switched to the third operating mode DMD3. When the first input 2000 is terminated (or not detected) in the second operating mode DMD2, an operating mode of the sensor driver 200C may be switched to the first operating mode DMD1. When the second input 3000 is terminated (or not detected) in the third operating mode DMD3, an operating mode of the sensor driver 200C may be switched to the first operating mode DMD1.

Referring to FIGS. 5, 14, and 15, operations in the first to third operating modes DMD1, DMD2, and DMD3 are shown in order of time (t).

In the first operating mode DMD1, the sensor driver 200C may repeatedly operate in a second mode MD2-d and a first mode MD1-d. During the second mode MD2-d, the sensor layer 200 may perform a scan driving operation to detect the second input 3000. During the first mode MD1-d, the sensor layer 200 may perform a scan driving operation to detect the first input 2000. FIG. 15 illustrates that the sensor driver 200C repeatedly operates in the first mode MD1-d following the second mode MD2-d, but the order is not limited thereto.

In the second operating mode DMD2, the sensor driver 200C may repeatedly operate in a second mode MD2-d and a first mode MD1-HS. During the second mode MD2-d, the sensor layer 200 may perform a scan driving operation to detect the second input 3000. During the first mode MD1-HS, the sensor layer 200 may perform a scan driving operation to detect coordinates corresponding to the first input 2000.

In the third operating mode DMD3, the sensor driver 200C may operate in a second mode MD2. During the second mode MD2, the sensor layer 200 may perform a scan driving operation to detect coordinates corresponding to the second input 3000. In the third operating mode DMD3, the sensor driver 200C may not operate in the first mode MD1-d or MD1-HS until the second input 3000 is terminated (or not detected).

Referring to FIG. 7 together, the sensor driver 200C may receive an auxiliary signal through at least one of the first auxiliary electrodes 230 and the second auxiliary electrodes 240 in the first mode MD1-HS of the second operating mode DMD2. The sensor driver 200C may determine whether the sensor layer 200 is in the LGM state, based on the auxiliary signal and may compensate for the signal received from the second electrodes 220. This will be more fully detailed later.

In the second mode MD2-d of the first operating mode DMD1 or the second operating mode DMD2, and the second mode MD2 of the third operating mode DMD3, one end of each of the first auxiliary electrodes 230 and the second auxiliary electrodes 240 may be floated. Moreover, in the second mode MD2-d and the second mode MD2, the other end of each of the first auxiliary electrodes 230 and the second auxiliary electrodes 240 may be grounded or floated. Accordingly, the sensing signal may be maximally compensated for by the coupling between the first electrodes 210 and the first auxiliary electrodes 230 and the coupling between the second electrodes 220 and the second auxiliary electrodes 240.

Figure 16:
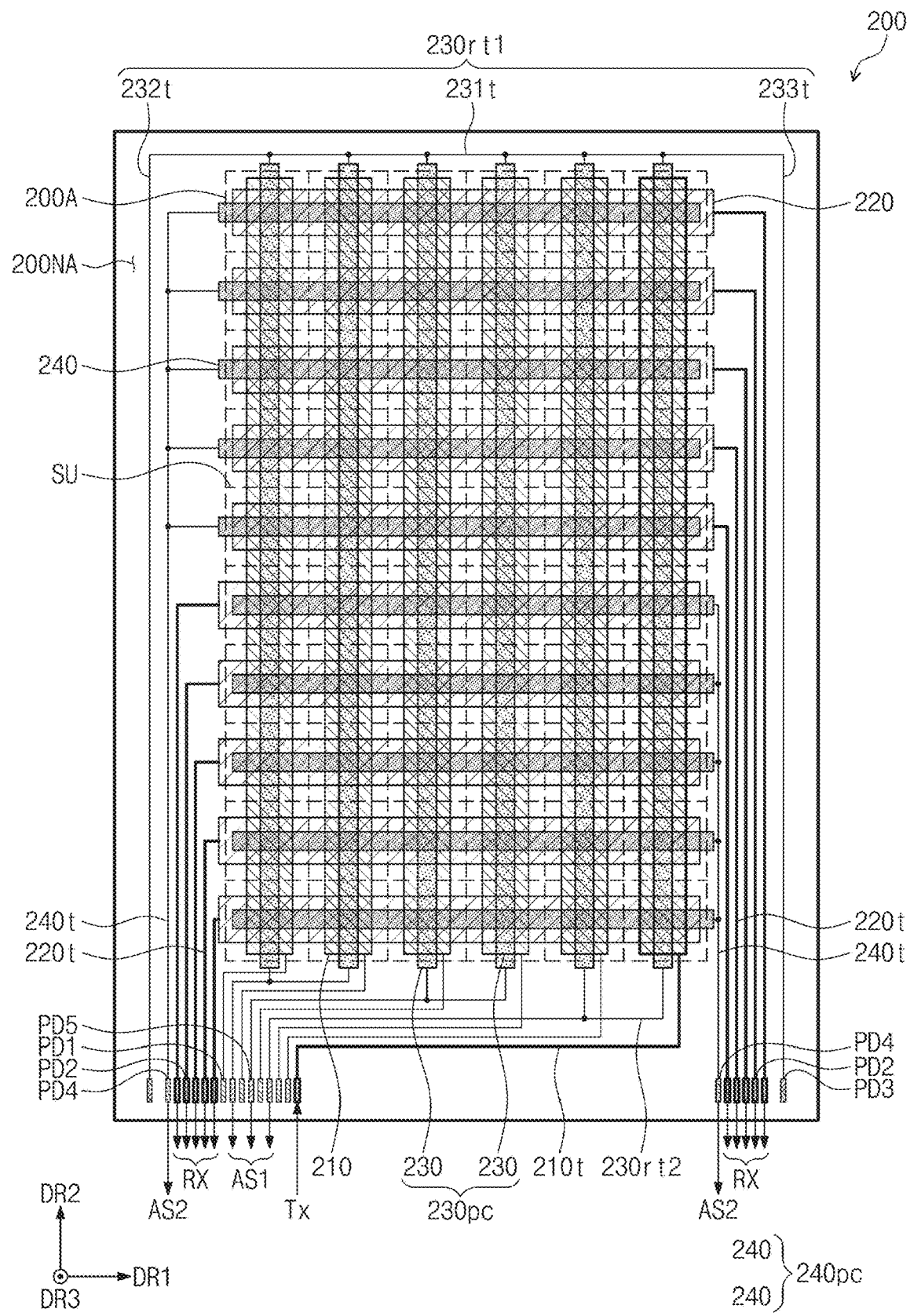
FIG. 16 is a diagram for describing a first mode according to an embodiment of the present disclosure.

FIG. 16 is a diagram for describing a first mode according to an embodiment of the present disclosure.

Referring to FIGS. 5, 15, and 16, the first mode MD1-HS of the second operating mode DMD2 may include a mutual capacitance detection mode. In the mutual capacitance detection mode, the sensor driver 200C may sequentially provide a transmission signal TX to the first electrodes 210 and may detect coordinates for the first input 2000 by using a sensing signal RX detected through the second electrodes 220. For example, the sensor driver 200C may be configured to calculate input coordinates by sensing changes in mutual capacitance between the first electrodes 210 and the second electrodes 220.

FIG. 16 illustrates that the transmission signal TX is provided to the one first electrode 210 and the sensing signal RX is output from the second electrodes 220. To clarify the expression of a signal, FIG. 16 illustrates that only one first electrode 210, to which the transmission signal TX is provided, is in bold. The sensor driver 200C may detect input coordinates of the first input 2000 by sensing a change in capacitance between the first electrode 210 and each of the second electrodes 220.

In an embodiment of the present disclosure, the sensor driver 200C may receive first auxiliary signals AS1 from the first auxiliary electrodes 230, and may receive second auxiliary signals AS2 from the second auxiliary electrodes 240. The sensor driver 200C may determine whether the sensor layer 200 is in an LGM state based on at least some of the first auxiliary signals AS1 and the second auxiliary signals AS2, and may compensate for the sensing signal RX received from the second electrodes 220. That is, in the first mode MD1-HS, the sensor driver 200C may receive the auxiliary signal AS1 or AS2 through at least one of the third trace line 230$rt$1, the fourth trace lines 240$t$, and the fifth trace lines 230$rt$2. The first mode of MD1-HS of the second operating mode DMD2 may be referred to as a "compensation sensing mode", "compensation determination mode", or "ground state sensing mode".

Figure 17:
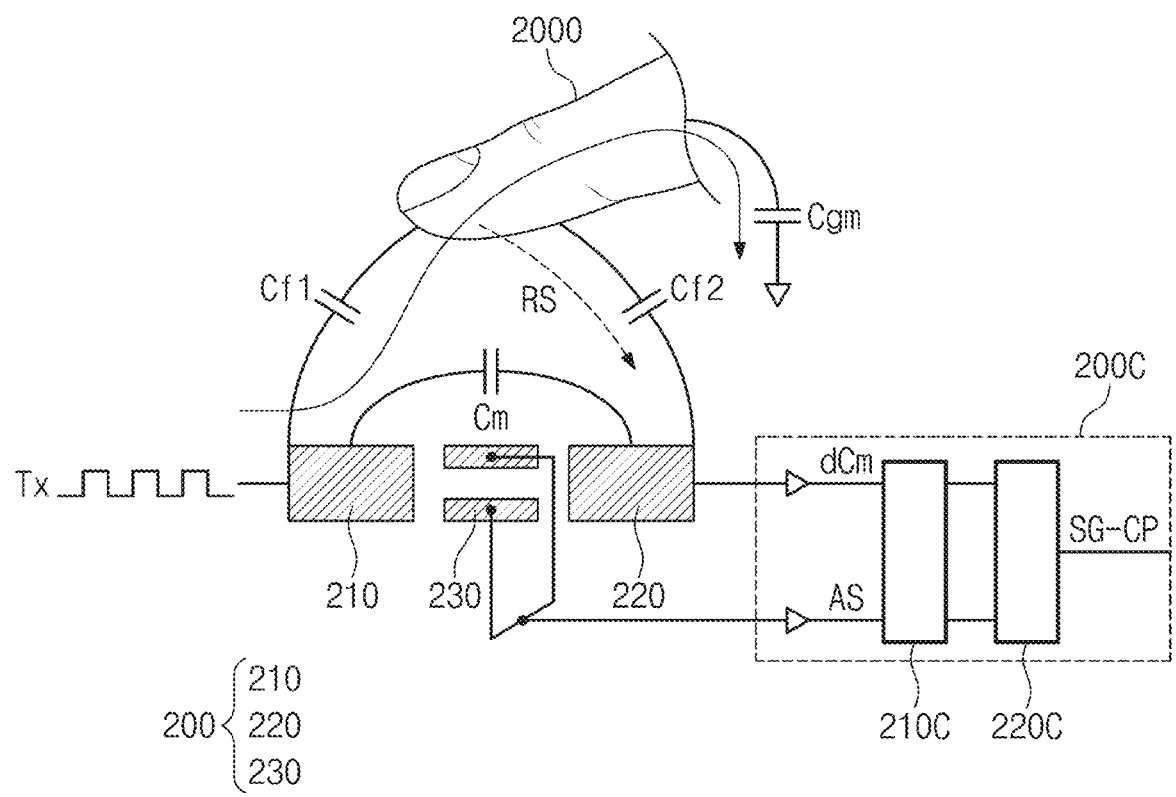
FIG. 17 is a diagram for describing a sensor layer and a sensor driver according to an embodiment of the present disclosure.
Figure 18:
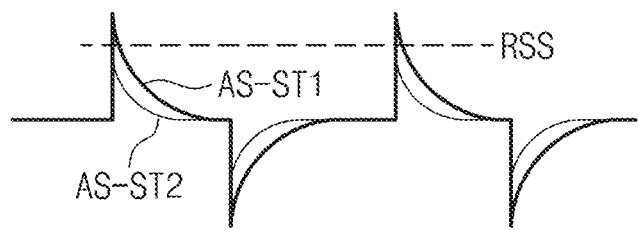
FIG. 18 is a diagram showing waveforms of auxiliary signals according to an embodiment of the present disclosure.
Figure 19:
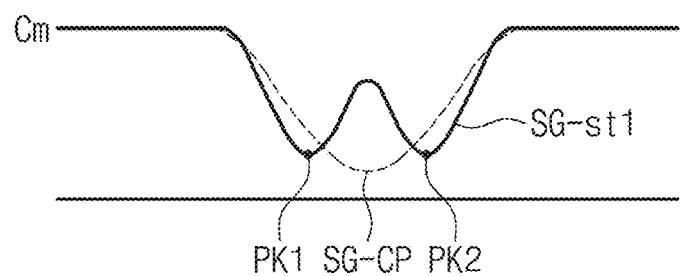
FIG. 19 is a diagram showing a waveform of a signal according to an embodiment of the present disclosure.

FIG. 17 is a diagram for describing the sensor layer 200 (see FIG. 7) and the sensor driver 200C according to an embodiment of the present disclosure. FIG. 18 is a diagram showing waveforms of auxiliary signals AS-ST1 and AS-ST2 according to an embodiment of the present disclosure. FIG. 19 is a diagram showing a waveform of a signal according to an embodiment of the present disclosure.

Referring to FIG. 17, the sensor driver 200C may include a compensation determination circuit 210C that determines whether compensation of the sensing signal RX is necessary, and a compensator 220C that compensates for the sensing signal RX depending on a determination result of the compensation determination circuit 210C. The compensation determination circuit 210C may be referred to as a compensation determinator, compensation determination unit, or compensation determination part.

Referring to FIGS. 7, 17, and 18, in an embodiment of the present disclosure, the compensation determination circuit 210C may be configured to compare maximum intensity of the auxiliary signal AS-ST1 or AS-ST2 with reference intensity RSS, and to determine that compensation of a sensing signal SG-st1 (see FIG. 19) is necessary, when the maximum intensity is greater than the reference intensity RSS. For example, when the maximum intensity of the auxiliary signal AS-ST1 is greater than the reference intensity RSS, it may be determined that the sensor layer 200 is in the LGM state. When the maximum intensity of the auxiliary signal AS-ST1 is smaller than the reference intensity RSS, it may be determined that the sensor layer 200 is not in the LGM state.

Referring to FIGS. 7, 17 and 19, in an embodiment of the present disclosure, the compensation determination circuit 210C may detect peak values PK1 and PK2 of changes in the mutual capacitance Cm between the first electrodes 210 and the second electrodes 220. When the number of peak values PK1 and PK2 greater than or equal to two, the compensation determination circuit 210C may be configured to determine that compensation of the sensing signal SG-st1 is necessary.

Referring to FIGS. 7, 17, 18, and 19, in an embodiment of the present disclosure, the compensation determination circuit 210C may detect peak values PK1 and PK2 of changes in the mutual capacitance Cm between the first electrodes 210 and the second electrodes 220. When the number of peak values PK1 and PK2 is greater than or equal to two, and the maximum intensity of the auxiliary signal AS-ST1 or AS-ST2 is greater than the reference intensity RSS, the compensation determination circuit 210C may be configured to determine that compensation of the sensing signal SG-st1 is necessary.

In an embodiment of the present disclosure, when it is determined that the sensor layer 200 is in the LGM state, the compensator 220C may perform an operation of compensating for the sensing signal SG-st1. For example, the sensing signal SG-st1 which has the two peaks PK1 and PK2 may be compensated to have a compensation sensing signal SG-CP which has one peak. Accordingly, as the distorted sensing signal SG-st1 according to the LGM state is compensated for, signal distortion may be reduced and coordinate accuracy may be improved.

The operation of the compensator 220C may be provided in various forms. For example, to compensate the sensing signal SG-st1 which has two peaks PK1 and PK2 to have the compensation sensing signal SG-CP which has one peak between the two peaks PK1 and PK2 of the sensing signal SG-st1. For example, when the compensator 220C performs a compensation operation, the waveform of the sensing signal SG-st1 may be adjusted by using the auxiliary signal AS-ST1 or AS-ST2. However, this is only an example. For example, the auxiliary signal AS-ST1 or AS-ST2 may be used to determine a ground mass of the sensor layer 200, and may not be used to compensate for the sensing signal SG-st1.

Figure 20:
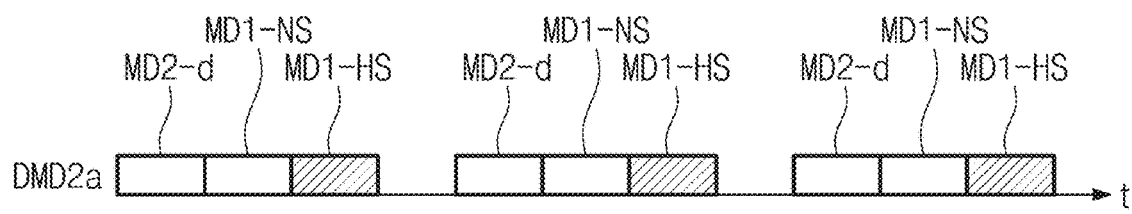
FIG. 20 is a diagram illustrating an operation of a sensor driver according to an embodiment of the present disclosure.

FIG. 20 is a diagram showing an operation of a sensor driver 200C (see FIG. 5) according to an embodiment of the present disclosure.

Referring to FIGS. 5, 14, and 20, the sensor driver 200C may be configured to selectively operate in one of the first operating mode DMD1, a second operating mode DMD2$a$, and the third operating mode DMD3. The second operating mode DMD2$a$ may be a mode for sensing the first input 2000 and waiting for the second input 3000.

In the second operating mode DMD2$a$, the sensor driver 200C may repeatedly operate in a second mode MD2-$d$, a third mode MD1-NS, and the first mode MD1-HS. During the second mode MD2-$d$, the sensor layer 200 may perform a scan driving operation to detect the second input 3000. During the third mode MD1-NS and the first mode MD1-HS, the sensor layer 200 may perform a scan driving operation to detect coordinates corresponding to the first input 2000.

The third mode MD1-NS may be referred to as a "normal mode". The first mode of MD1-HS of the second operating mode DMD2$a$ may be referred to as a "compensation sensing mode", "compensation determination mode", or "ground state sensing mode".

In the third mode MD1-NS, the sensor driver 200C may output the transmission signal TX to at least one of the first electrodes 210 and may receive the sensing signal RX from the second electrodes 220. In the third mode MD1-NS, the first auxiliary electrodes 230 and the second auxiliary electrodes 240 may be grounded.

In the first mode MD1-HS, the sensor driver 200C may output the transmission signal TX to at least one of the first electrodes 210 and may receive the sensing signal RX from the second electrodes 220. Moreover, in the first mode MD1-HS, the sensor driver 200C may receive the auxiliary signal AS (see FIG. 17) from the first auxiliary electrodes 230 and the second auxiliary electrodes 240. The sensor driver 200C may determine whether the sensor layer 200 is in the LGM state based on the auxiliary signal AS and may compensate for the signal received from the second electrodes 220.

Figure 21:
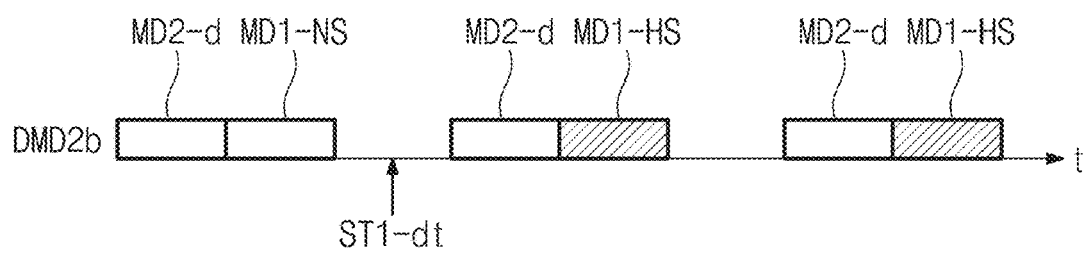
FIG. 21 is a diagram illustrating an operation of a sensor driver according to an embodiment of the present disclosure.

FIG. 21 is a diagram illustrating an operation of a sensor driver according to an embodiment of the present disclosure.

Referring to FIGS. 5, 14, and 21, the sensor driver 200C may be configured to selectively operate in one of the first operating mode DMD1, a second operating mode DMD2b, and a third operating mode DMD3. The second operating mode DMD2b may be a mode for sensing the first input 2000 and waiting for the second input 3000.

In the second operating mode DMD2b, the sensor driver 200C may repeatedly operate in the second mode MD2-d and the third mode MD1-NS. When it is determined that compensation of the sensing signal SG-st1 is necessary in the second operating mode DMD2b, the sensor driver 200C may be configured to repeatedly operate in the second mode MD2-d and the first mode MD1-HS.

For example, when it is determined that the electronic device 1000 enters the first use state ST1, the sensor driver 200C may repeatedly operate in the second mode MD2-d and the first mode MD1-HS from a time point of entry into the first state ST1-dt. The third mode MD1-NS may be referred to as a "normal mode". The first mode of MD1-HS may be referred to as a "compensation sensing mode".

Figure 22:
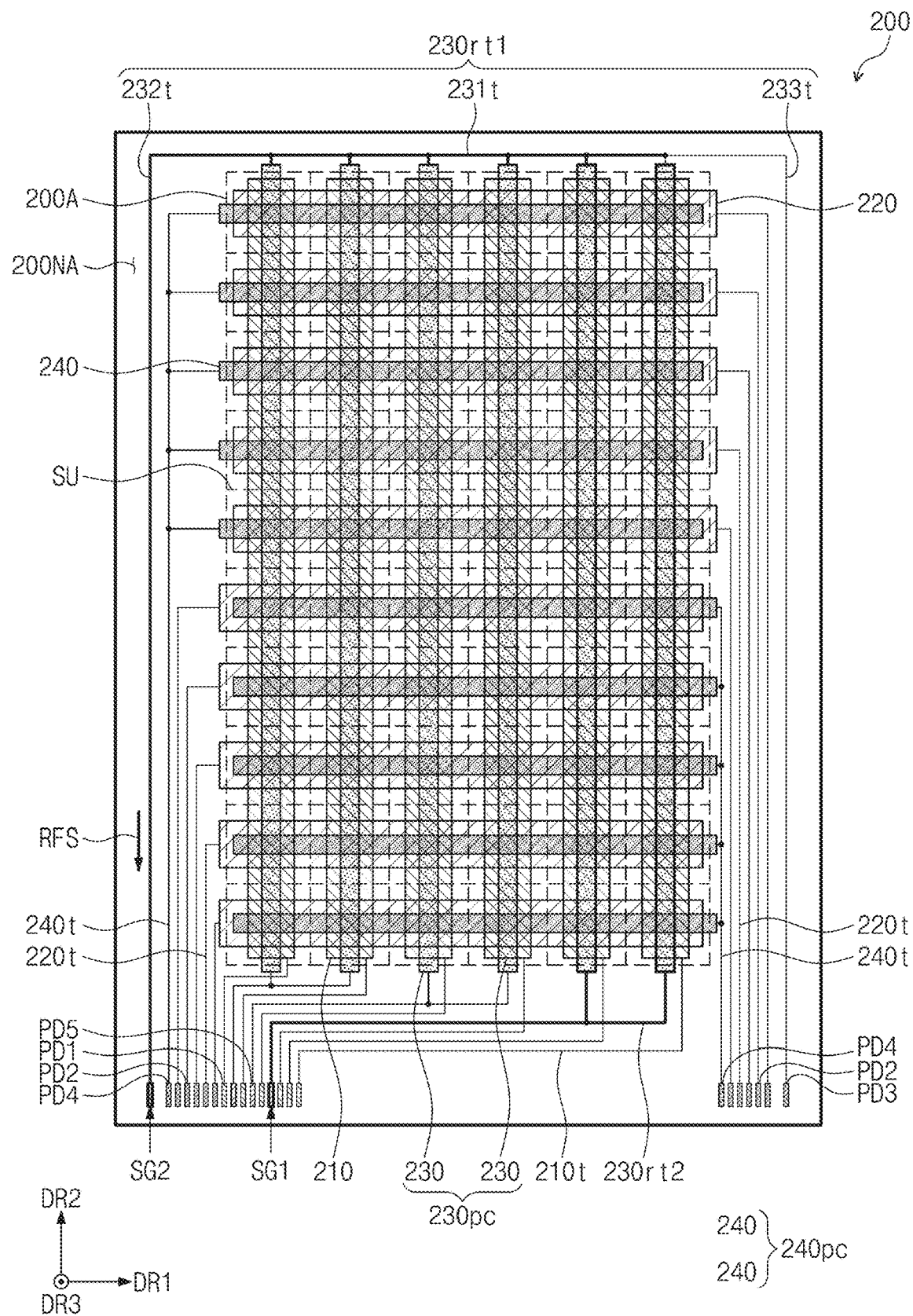
FIG. 22 is a diagram for describing a second mode according to an embodiment of the present disclosure.
Figure 23A:
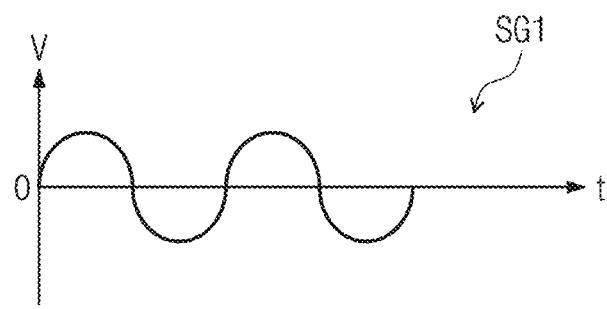
FIG. 23A is a graph showing a waveform of a first signal according to an embodiment of the present disclosure.
Figure 23B:
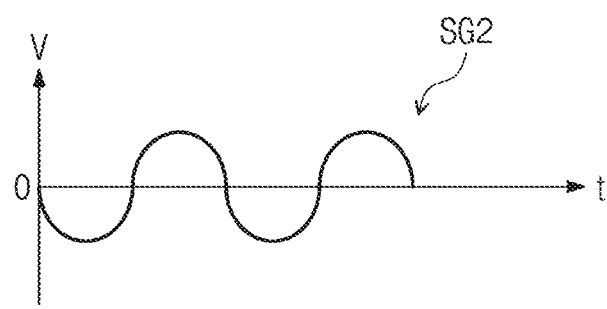
FIG. 23B is a graph showing a waveform of a second signal according to an embodiment of the present disclosure.

FIG. 22 is a diagram for describing a second mode, particularly a charging driving mode, according to an embodiment of the present disclosure. FIG. 23A is a graph showing a waveform of a first signal according to an embodiment of the present disclosure. FIG. 23B is a graph showing a waveform of a second signal according to an embodiment of the present disclosure.

Referring to FIGS. 15, 22, 23A, and 23B, the second mode MD2 may include a charging driving mode. The charging driving mode may include a searching charging driving mode and a tracking charging driving mode.

The searching charging driving mode may be a driving mode before a location of the pen is sensed. Accordingly, a first signal SG1 or a second signal SG2 may be provided to all channels included in the sensor layer 200. In other words, the entire area of the sensor layer 200 may be scanned in the searching charging driving mode. When the pen PN is sensed in the searching charging driving mode, the sensor layer 200 may be driven for tracking charging. For example, in the tracking charging driving mode, the sensor driver 200C may not output the first signal SG1 and the second signal SG2 to the entire sensor layer 200 but sequentially output the first signal SG1 and the second signal SG2 to an area which overlaps a point where the pen PN is sensed.

In the charging driving mode, the sensor driver 200C may apply the first signal SG1 to one of third pads PD3 and fifth pads PD5 and may apply the second signal SG2 to the other pad. The second signal SG2 may be a reverse signal of the first signal SG1. For example, the first signal SG1 may be a sinusoidal signal.

Because the first signal SG1 and the second signal SG2 are applied to at least two pads, a current RFS may have a current path through one pad to the other pad. Furthermore, because the first signal SG1 and the second signal SG2 are sinusoidal signals having a reverse-phase relationship to each other, the direction of the current RFS may change periodically. In an embodiment of the present disclosure, the first signal SG1 and the second signal SG2 may be square wave signals having a reverse-phase relationship to each other.

When the first signal SG1 and the second signal SG2 have a reverse-phase relationship, noise caused by the first signal SG1 in the display layer 100 (see FIG. 4) may be canceled out with noise caused by the second signal SG2. Accordingly, a flicker may not occur in the display layer 100, and the display quality of the display layer 100 may be improved.

In an embodiment of the present disclosure, the first signal SG1 may be a sinusoidal signal. However, an embodiment is not limited thereto, and the first signal SG1 may be a square wave signal. Besides, the second signal SG2 may have a predetermined constant voltage. For example, the second signal SG2 may be a ground voltage. In other words, the pad through which the second signal SG2 is applied is grounded. In this case, the current RFS may flow from one pad to the other pad. Also, because the first signal SG1 is a sinusoidal wave signal or square wave signal even when the other pad is grounded, the direction of the current RFS may change periodically.

Referring to FIG. 22, the second signal SG2 is provided through one third pad PD3 connected to the third trace line 230rt1, and the first signal SG1 is provided through one fifth pad PD5 connected to the first auxiliary electrode 230. The current RFS may flow through the fifth pad PD5, a fifth trace line 230rt2 connected to the fifth pad PD5, the first auxiliary electrode 230, a portion of the third trace line 230rt1 connected to the third pad PD3, and the third pad PD3. Furthermore, in the third operating mode DMD3 (see FIG. 14), the sensor driver 200C may be configured to apply the first signal SG1 to at least one first auxiliary electrode among the first auxiliary electrodes 230 and to apply the second signal SG2 to at least another first auxiliary electrode. Accordingly, the third operating mode DMD3 may include a charging driving mode in which a current path including the at least one first auxiliary electrode and the at least another first auxiliary electrode is defined.

The current path may have the form of a coil. Accordingly, in the charging driving mode of the second mode, the resonant circuit of the pen PN may be charged by the current path. A current path of the loop coil pattern may be implemented by the components included in the sensor layer 200. Accordingly, the electronic device 1000 (see FIG. 1A) may charge the pen PN by using the sensor layer 200. Accordingly, because there is no need to add a separate configuration having a coil for charging the pen PN, the thickness, weight, and flexibility of the electronic device 1000 may not increase.

In the charging driving mode, the first electrodes 210, the second electrodes 220, and the second auxiliary electrodes 240 may be grounded, or may be electrically floated. Alternatively, a constant voltage may be applied to the first electrodes 210, the second electrodes 220, and the second auxiliary electrodes 240. In particular, the first electrodes 210, the second electrodes 220, and the second auxiliary electrodes 240 may be floated. In this case, the current RFS may not flow to the first electrodes 210, the second electrodes 220, and the second auxiliary electrodes 240.

Figure 24:
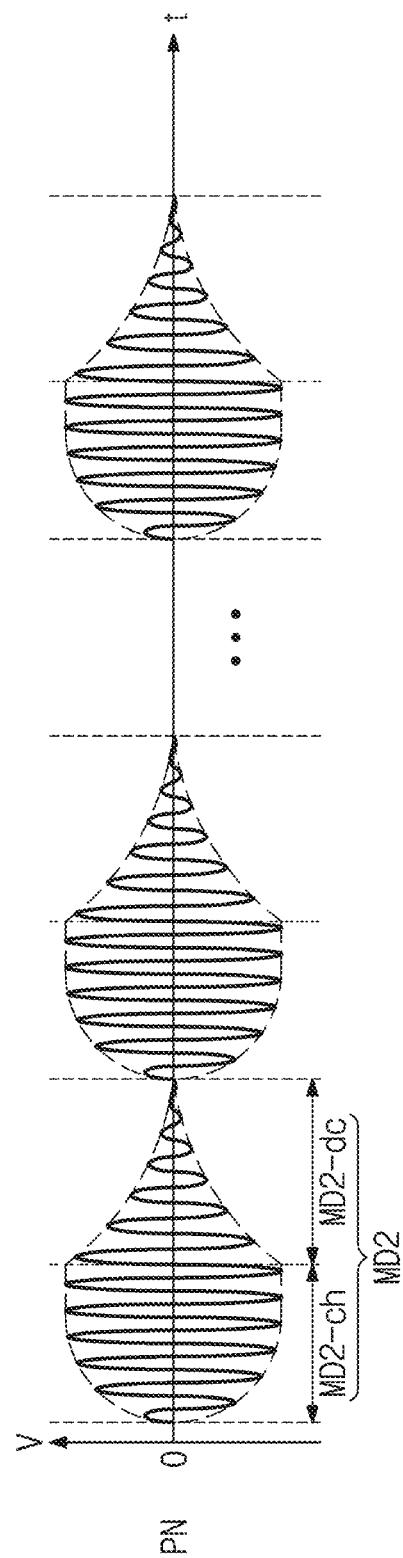
FIG. 24 is a diagram for describing an operation of a pen according to an embodiment of the present disclosure.

FIG. 24 is a diagram for describing an operation of the pen PN according to an embodiment of the present disclosure.

Referring to FIGS. 22 and 24, the second mode MD2 may include a charging section MD2-ch and a discharging section MD2-dc. The charging section MD2-ch may correspond to a charging driving mode. The discharging section MD2-dc may correspond to a pen sensing driving mode.

During a first time section, the first signal SG1 and the second signal SG2 may be provided to the sensor layer 200. The first time section may correspond to one charging section MD2-ch. During the first time section, the pen PN disposed adjacent to the sensor layer 200 may be charged.

For example, an inductor generates a current by a magnetic field formed in the sensor layer 200. The generated current is delivered to a capacitor. The capacitor charges the current input from the inductor. Afterward, the capacitor may discharge the charged current into the inductor and the inductor may emit a magnetic field at the resonant frequency.

The section where the magnetic field is emitted from the pen PN may correspond to the discharging section MD2-*dc*. An induced current may flow through the sensor layer 200 by the magnetic field emitted by the pen PN, and the induced current may be delivered to the sensor driver 200C as a sensing signal (or a reception signal).

Figure 25A:
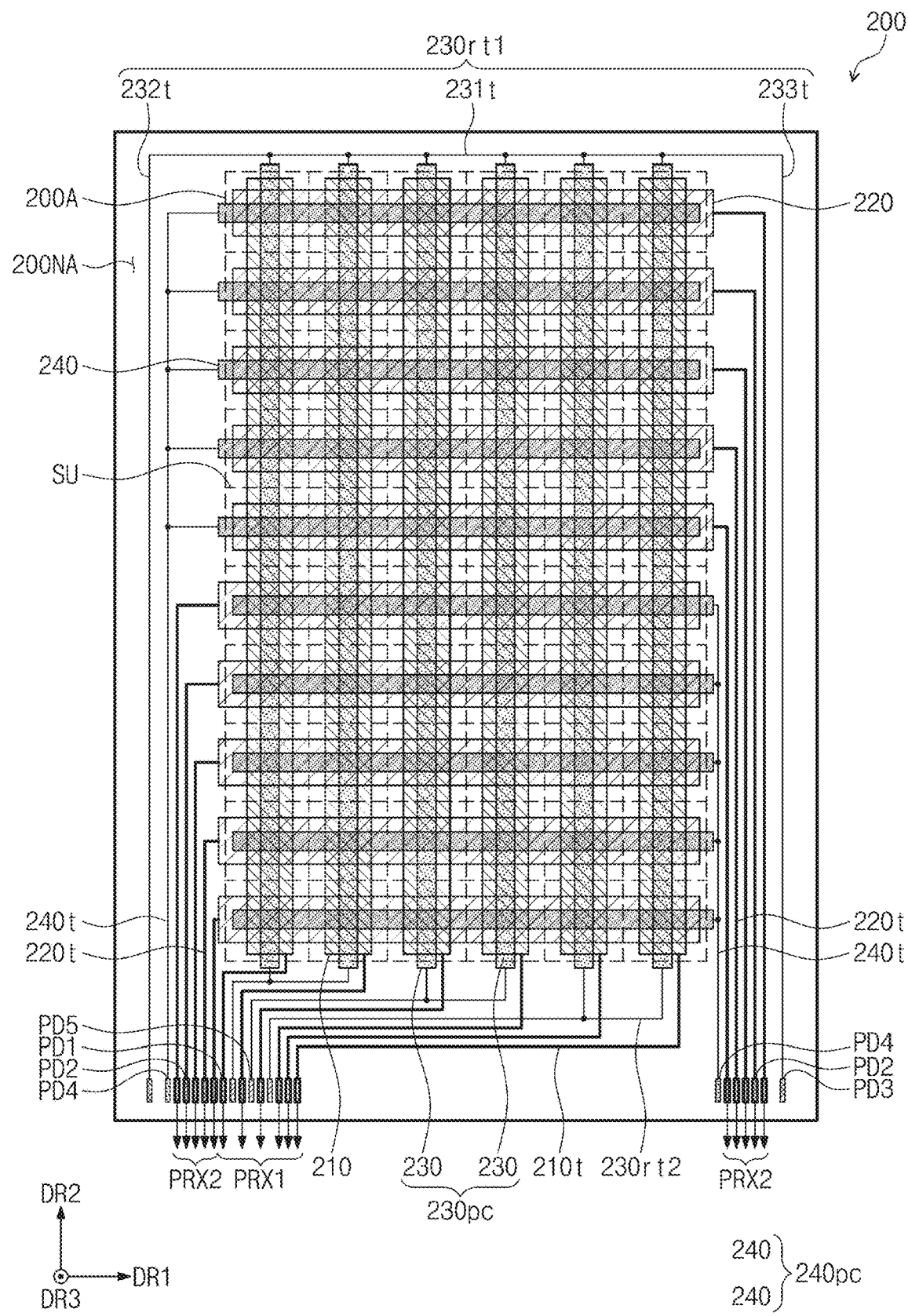
FIG. 25A is a diagram for describing a second mode according to an embodiment of the present disclosure.
Figure 25B:
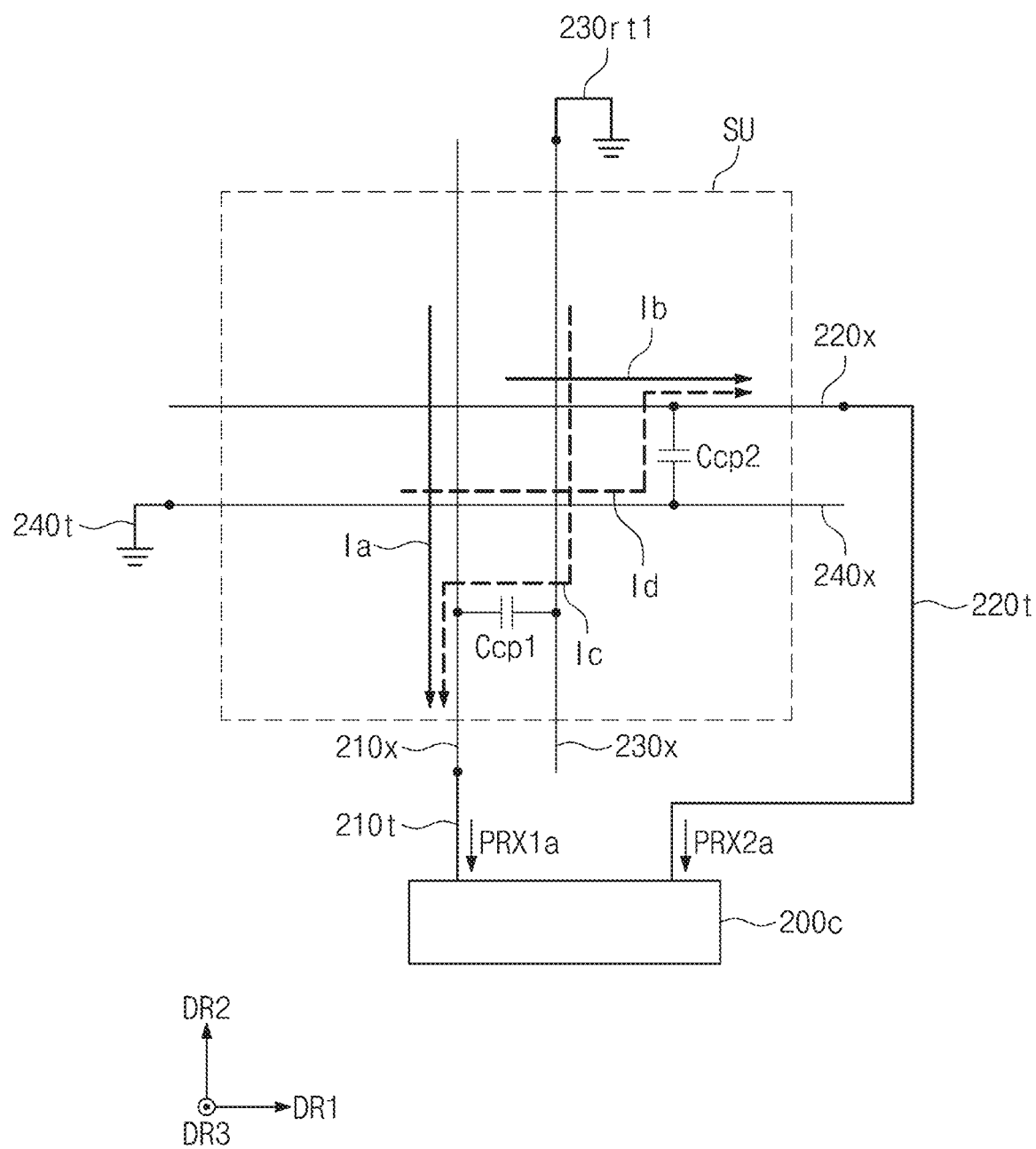
FIG. 25B is a diagram for describing a second mode based on one sensing unit according to an embodiment of the present disclosure.

FIG. 25A is a diagram for describing a second mode according to an embodiment of the present disclosure. FIG. 25B is a diagram for describing a second mode based on one sensing unit according to an embodiment of the present disclosure.

Referring to FIGS. 25A and 25B, a second mode may include a charging driving mode and a pen sensing driving mode. FIGS. 25A and 25B are diagrams for describing the pen sensing driving mode.

Referring to FIG. 25A, in the pen sensing driving mode, first receive signals PRX1 may be output from the first electrodes 210 and second receive signals PRX2 may be output from the second electrodes 220. FIG. 25B shows the one sensing units SU through which first to fourth induced currents Ia, Ib, Ic, and Id generated by the pen PN flow.

In an embodiment of the present disclosure, the routing directions of one electrode of the sensor layer 200 and the other electrode thereof, which overlap each other, may be different from each other. For example, the routing direction of the first electrode 210*x* may be different from the routing direction of the first auxiliary electrode 230*x*. Also, the routing direction of the second electrode 220*x* may be different from the routing direction of the second auxiliary electrode 240*x*. For example, in FIG. 25B, the first electrode 210*x* and the first trace line 210*t* may be connected in a lower portion of the sensing unit SU. The first auxiliary electrode 230*x* and the third trace line 230*rt*1 may be connected in an upper portion of the sensing unit SU. The second electrode 220*x* and the second trace line 220*t* may be connected on the right side of the sensing unit SU. The second auxiliary electrode 240*x* and the fourth trace line 240*t* may be connected on the left side of the sensing unit SU.

An RLC resonant circuit of the pen PN may emit a magnetic field at a resonant frequency while discharging charged charges. Due to the magnetic field provided by the pen PN, the first induced current Ia may be generated in the first electrode 210*x*, and the second induced current Ib may be generated in the second electrode 220*x*. Moreover, the third induced current Ic may be generated in the first auxiliary electrode 230*x*, and the fourth induced current Id may also be generated in the second auxiliary electrode 240*x*.

A first coupling capacitance Ccp1 may be formed between the first auxiliary electrode 230*x* and the first electrode 210*x*. A second coupling capacitance Ccp2 may be formed between the second auxiliary electrode 240*x* and the second electrode 220*x*. The third induced current Ic may be delivered to the first electrode 210*x* through the first coupling capacitance Ccp1. The fourth induced current Id may be delivered to the second electrode 220*x* through the second coupling capacitance Ccp2.

The sensor driver 200C may receive a first sensing signal PRX1*a*, which is based on the first induced current Ia and the third induced current Ic, from the first electrode 210*x* and may receive a second sensing signal PRX2*a*, which is based on the second induced current Ib and the fourth induced current Id, from the second electrode 220*x*. The sensor driver 200C may detect input coordinates of the pen PN based on the first sensing signal PRX1*a* and the second sensing signal PRX2*a*.

The sensor driver 200C may receive the first detection signal PRX1*a* from the first electrode 210*x* and may receive the second detection signal PRX2*a* from the second electrode 220*x*. In this case, all ends of the first auxiliary electrode 230*x* and the second auxiliary electrode 240*x* may be floated. Accordingly, the sensing signal may be maximally compensated for by the coupling between the first electrode 210*x* and the first auxiliary electrode 230*x* and the coupling between the second electrodes 220*x* and the second auxiliary electrode 240*x*.

Besides, the other ends of the first auxiliary electrode 230*x* and the second auxiliary electrode 240*x* may be grounded or floated. Accordingly, the third induced current Ic and the fourth induced current Id may be sufficiently delivered to the first electrode 210*x* and the second electrode 220*x* by the coupling between the first electrode 210*x* and the first auxiliary electrode 230*x* and by the coupling between the second electrode 220*x* and the second auxiliary electrodes 240*x*, respectively.

Figure 26:
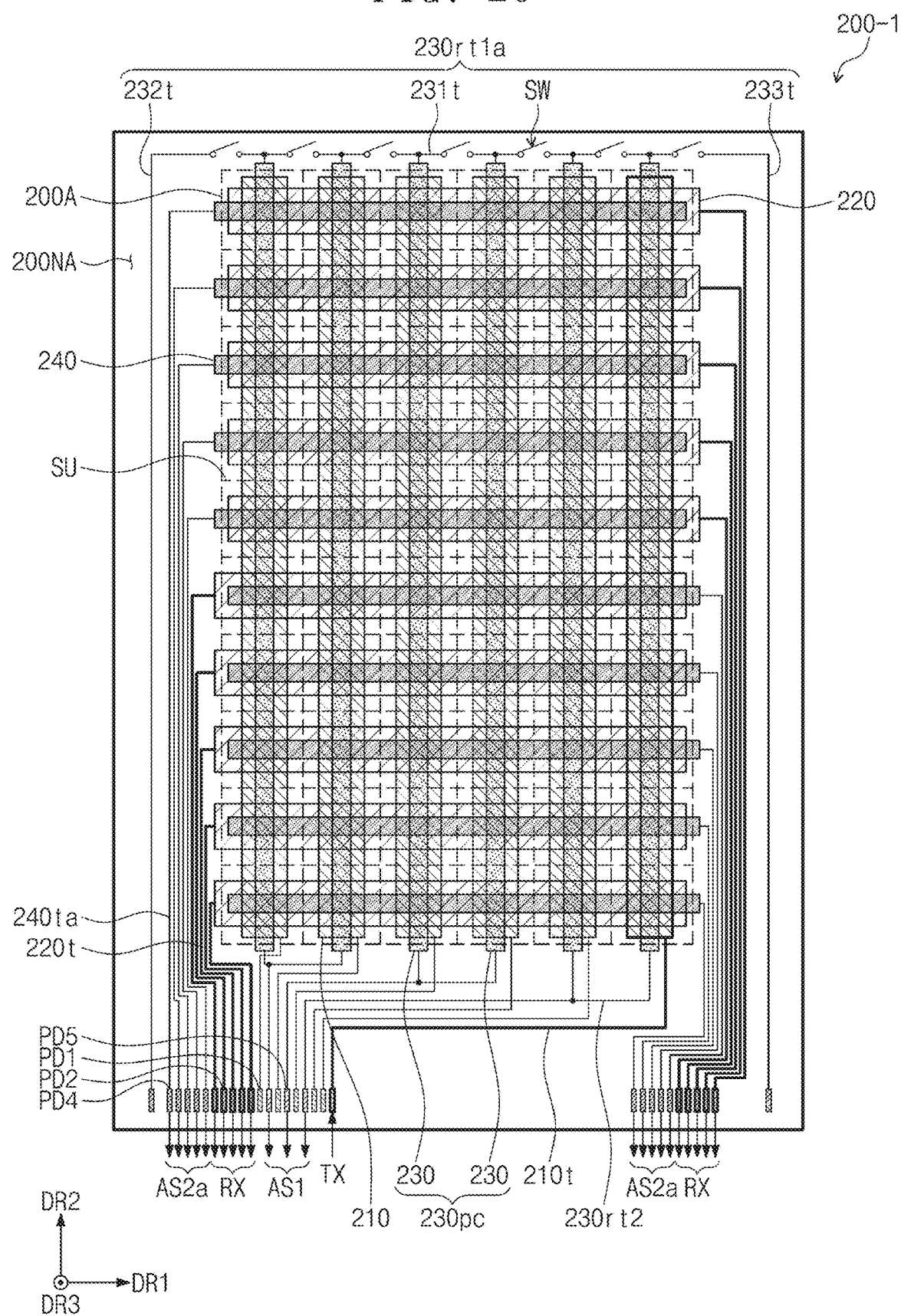
FIG. 26 is a diagram for describing a first mode according to an embodiment of the present disclosure.

FIG. 26 is a diagram for describing a first mode according to an embodiment of the present disclosure. In the description of FIG. 26, the same reference numerals are assigned to the same components described with reference to FIG. 7, and thus the descriptions thereof are omitted to avoid redundancy.

Referring to FIG. 26, a sensor layer 200-1 may include a first trace lines 210*t*, a second trace lines 220*t*, a third trace line 230*rt*1*a*, a fourth trace lines 240*ta*, and a fifth trace lines 230*rt*2 which are disposed in the peripheral area 200NA.

The first trace lines 210*t* may be electrically connected to the first electrodes 210 in a one-to-one correspondence. The second trace lines 220*t* may be electrically connected to the second electrodes 220 in a one-to-one correspondence. The third trace line 230*rt*1*a* may be electrically connected to all the first auxiliary electrodes 230. The fourth trace lines 240*ta* may be electrically connected to the second auxiliary electrodes 240 in a one-to-one correspondence. The fifth trace lines 230*rt*2 may be connected to the first electrode groups 230*pc* in a one-to-one correspondence.

According to an embodiment of the present disclosure, the third trace line 230*rt*1*a* may further include a plurality of switch elements SW. For example, the switch elements SW may control an electrical connection between the first auxiliary electrodes 230. For example, in the first mode MD1-HS, the sensor driver 200C may sequentially provide the transmission signal TX to the first electrodes 210, and may detect coordinates for the first input 2000 by using the sensing signal RX detected through the second electrodes 220. In the first mode MD1-HS, all the switch elements SW may be turned off. Accordingly, all the electrical connections between ends of the first auxiliary electrodes 230 may be disconnected.

In an embodiment of the present disclosure, the sensor driver 200C may receive first auxiliary signals AS1 from the first auxiliary electrodes 230, and may receive second auxiliary signals AS2*a* from the second auxiliary electrodes 240. The sensor driver 200C may determine whether the sensor layer 200-1 is in an LGM state based on the auxiliary signals AS1 and AS2*a*, and may compensate for the sensing signal RX received from the second electrodes 220.

Figure 27:
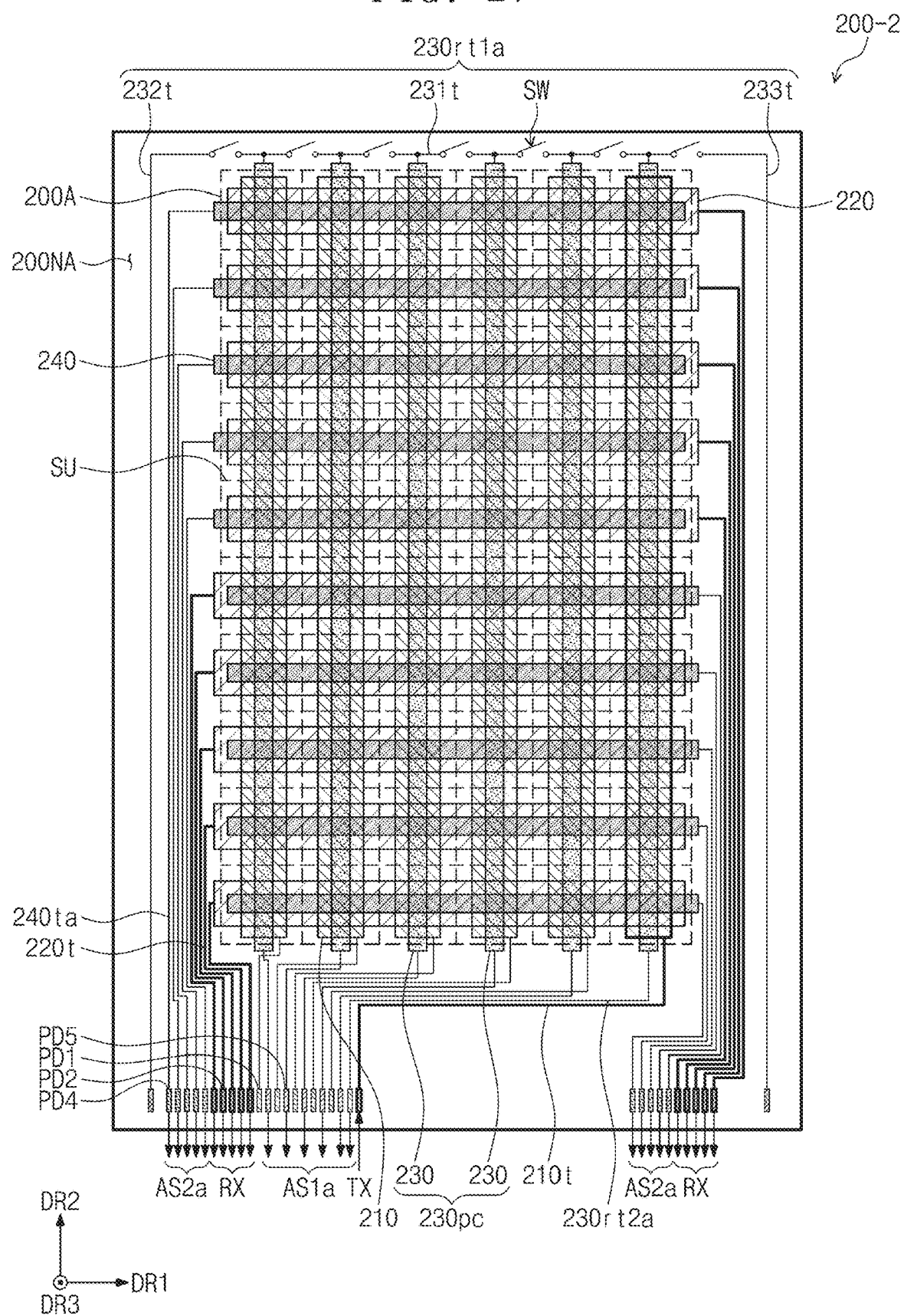
FIG. 27 is a diagram for describing a first mode according to an embodiment of the present disclosure.

FIG. 27 is a diagram for describing a first mode, according to an embodiment of the present disclosure. In the description of FIG. 27, the same reference numerals are assigned to the same components described with reference to FIGS. 7 and 26, and thus the descriptions thereof are omitted to avoid redundancy.

Referring to FIG. 27, a sensor layer 200-2 may include a first trace lines 210t, a second trace lines 220t, a third trace line 230rt1a, a fourth trace lines 240ta, and a fifth trace lines 230rt2a, which are disposed in the peripheral area 200NA.

The first trace lines 210t may be electrically connected to the first electrodes 210 in a one-to-one correspondence. The second trace lines 220t may be electrically connected to the second electrodes 220 in a one-to-one correspondence. The third trace line 230rt1a may be electrically connected to all the first auxiliary electrodes 230. The fourth trace lines 240ta may be electrically connected to the second auxiliary electrodes 240 in a one-to-one correspondence. The fifth trace lines 230rt2a may be connected to the first auxiliary electrodes 230 in a one-to-one correspondence.

In the first mode MD1-HS, the sensor driver 200C may sequentially provide the transmission signal TX to the first electrodes 210, and may detect coordinates for the first input 2000 by using the sensing signal RX detected through the second electrodes 220. In the first mode MD1-HS, all the switch elements SW may be turned off. Accordingly, all the electrical connections between ends of the first auxiliary electrodes 230 may be disconnected.

In an embodiment of the present disclosure, the sensor driver 200C may receive first auxiliary signals AS1a from the first auxiliary electrodes 230, and may receive second auxiliary signals AS2a from the second auxiliary electrodes 240, respectively. The sensor driver 200C may determine whether the sensor layer 200-2 is in an LGM state based on the auxiliary signals AS1a and AS2a, and may compensate for the signal received from the second electrodes 220. For example, the sensor driver 200C may compensate for the sensing signal RX received from the second electrodes 220 by using the auxiliary signals AS1a and AS2a. That is, in an embodiment of the present disclosure, the auxiliary signals AS1a and AS2a may be used to compensate for the sensing signal RX in addition to determining the LGM state.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

As described above, it is possible to sense an input by a pen as well as a touch input by using a sensor layer. Accordingly, because there is no need to add a separate component (e.g., a digitizer) for sensing a pen to an electronic device, an increase in the thickness of an electronic device, an increase in the weight of the electronic device, or a decrease in flexibility of the electronic device which may occur due to the addition of a digitizer may not occur. Moreover, it may be determined that a sensor layer is in a low ground mass (LGM) state in a first mode for detecting a first input by using at least some of first auxiliary electrodes and second auxiliary electrodes. In this case, distorted detection signals according to the LGM status may be compensated for. Accordingly, signal distortion in the LGM state may be reduced and coordinate accuracy may be improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising: a sensor layer; and a sensor driver configured to drive the sensor layer and to operate in a first mode for sensing a touch input and a second mode for sensing a pen input, wherein the sensor layer includes: a plurality of first electrodes arranged in a first direction and extending in a second direction intersecting the first direction; a plurality of second electrodes arranged in the second direction and extending in the first direction; a plurality of first auxiliary electrodes arranged in the first direction, extending in the second direction, and overlapping the plurality of first electrodes, respectively; and a plurality of second auxiliary electrodes arranged in the second direction, extending in the first direction, and overlapping the plurality of second electrodes, respectively, wherein the sensor driver in the first mode is configured to: output a transmission signal to at least one of the plurality of first electrodes; receive a sensing signal from the plurality of second electrodes; receive an auxiliary signal from at least one of the plurality of first auxiliary electrodes and the plurality of second auxiliary electrodes; and compensate for the sensing signal based on the auxiliary signal; and wherein the sensor driver includes: a compensation determination circuit configured to determine whether compensation of the sensing signal is necessary; and a compensator configured to compensate for the sensing signal depending on a determination result of the compensation determination circuit.

2. The electronic device of claim 1, wherein the compensation determination circuit is configured to:
  detect a peak value of a change amount in mutual capacitance between the plurality of first electrodes and the plurality of second electrodes; and
  determine that the compensation of the sensing signal is necessary, when the number of the peak value is greater than or equal to two.

3. The electronic device of claim 1, wherein the compensation determination circuit is configured to:
  compare maximum intensity of the auxiliary signal with reference intensity; and
  determine that the compensation of the sensing signal is necessary when the maximum intensity of the auxiliary signal is greater than the reference intensity.

4. The electronic device of claim 1, wherein the compensation determination circuit is configured to:
  detect a peak value of a change amount in mutual capacitance between the plurality of first electrodes and the plurality of second electrodes; and
  determine that the compensation of the sensing signal is necessary when the number of the peak value is greater than or equal to two and maximum intensity of the auxiliary signal is greater than reference intensity.

5. The electronic device of claim 1, wherein the second mode includes a pen sensing driving mode, and
  wherein the plurality of first auxiliary electrodes are electrically connected to a ground in the pen sensing driving mode and the plurality of second auxiliary electrodes are electrically connected to a ground in the pen sensing driving mode.

6. The electronic device of claim 5, wherein a plurality of first coupling capacitors are defined between one first electrode of the plurality of first electrodes and one first auxiliary electrode of the plurality of first auxiliary electrodes, and a plurality of second coupling capacitors are defined between one second electrode of the plurality of second electrodes and one second auxiliary electrode of the plurality of second auxiliary electrodes, and wherein the sensor driver in the pen sensing driving mode is configured to:

receive a first induced current flowing toward the one first electrode from the one first auxiliary electrode through the plurality of first coupling capacitors; and receive a second induced current flowing toward the one second electrode from the one second auxiliary electrode through the plurality of second coupling capacitors.

7. The electronic device of claim 1, wherein the second mode further includes a charging driving mode, wherein the sensor driver in the charging driving mode is configured to:

apply a first signal to at least one first auxiliary electrode among the plurality of first auxiliary electrodes; and apply a second signal to at least another first auxiliary electrode, and wherein a current path is formed between the at least one first auxiliary electrode and the at least another first auxiliary electrode.

8. The electronic device of claim 1, wherein the sensor driver is configured to selectively operate in one of a first operating mode for waiting for the touch input and the pen input, a second operating mode for sensing the touch input and waiting for the pen input, or a third operating mode for sensing the pen input, and wherein the sensor driver in each of the first operating mode and the second operating mode is configured to:

repeatedly operate in the first mode and the second mode, and wherein the sensor driver in the third operating mode is configured to operate in the second mode.

9. The electronic device of claim 8, wherein the second operating mode further includes a third mode for sensing the touch input, wherein the sensor driver in the third mode is configured to:

output a transmission signal to at least one of the plurality of first electrodes; and receive a sensing signal from the plurality of second electrodes, and wherein the plurality of first auxiliary electrodes and the plurality of second auxiliary electrodes are grounded.

10. The electronic device of claim 9, wherein the sensor driver in the second operating mode is configured to repeatedly operate in the second mode, the third mode, and the first mode.

11. The electronic device of claim 9, wherein the sensor driver in the second operating mode is configured to repeatedly operate in the second mode and the first mode when it is determined that compensation of the sensing signal is necessary, and wherein the sensor driver in the second operating mode is configured to repeatedly operate in the second mode and the third mode when it is determined that the compensation of the sensing signal is not necessary.

12. The electronic device of claim 1, wherein the sensor layer includes:

a plurality of first trace lines electrically connected to the plurality of first electrodes, respectively;

a plurality of second trace lines electrically connected to the plurality of second electrodes, respectively;

a third trace line electrically connected to the plurality of first auxiliary electrodes;

a fourth trace line electrically connected to the plurality of second auxiliary electrodes; and a plurality of fifth trace lines electrically connected to the plurality of first auxiliary electrodes, and wherein the sensor driver is configured to receive the auxiliary signal through at least one of the plurality of fifth trace lines and the fourth trace line in the first mode.

13. An electronic device comprising:

a sensor layer including a plurality of first electrodes, a plurality of second electrodes, a plurality of first auxiliary electrodes, and a plurality of second auxiliary electrodes; and a sensor driver configured to:

drive the sensor layer; and operate in one of a first operating mode for waiting for a touch input and a pen input, a second operating mode for sensing the touch input and waiting for the pen input, and a third operating mode for sensing the pen input, wherein the sensor driver in the second operating mode is configured to:

output a transmission signal to at least one of the plurality of first electrodes; and receive a sensing signal from the plurality of second electrodes, wherein the second operating mode includes a compensation sensing mode in which an auxiliary signal is received from at least one of the plurality of first auxiliary electrodes and the plurality of second auxiliary electrodes, wherein the sensor driver in the third operating mode is configured to:

apply a first signal to at least one first auxiliary electrode among the plurality of first auxiliary electrodes; and apply a second signal to at least another first auxiliary electrode, and wherein the third operating mode includes a charging driving mode in which a current path is formed between the at least one first auxiliary electrode and the at least another first auxiliary electrode.

14. The electronic device of claim 13, wherein the second operating mode further includes a normal mode for sensing the touch input, wherein the sensor driver in the normal mode is configured to:

output a transmission signal to at least one of the plurality of first electrodes; and receive a sensing signal from the plurality of second electrodes, and wherein the plurality of first auxiliary electrodes and the plurality of second auxiliary electrodes are grounded.

15. The electronic device of claim 14, wherein the sensor driver in the second operating mode is configured to repeatedly operate in the normal mode and the compensation sensing mode.

16. The electronic device of claim 14, wherein the sensor driver in the second operating mode is configured to operate in the compensation sensing mode when it is determined that compensation of the sensing signal is necessary, and wherein the sensor driver in the second operating mode is configured to operate in the normal mode when it is determined that the compensation of the sensing signal is not necessary.

17. The electronic device of claim 13, wherein the sensor driver includes:

a compensation determination circuit configured to determine whether compensation of the sensing signal is necessary; and a compensator configured to compensate for the sensing signal depending on a determination result of the compensation determination circuit.

18. The electronic device of claim 17, wherein the compensation determination circuit is configured to:

detect a peak value of a change amount in mutual capacitance between the plurality of first electrodes and the plurality of second electrodes; and determine that the compensation of the sensing signal is necessary when the number of the peak value is greater than or equal to two.

19. The electronic device of claim 17, wherein the compensation determination circuit is configured to:

compare maximum intensity of the auxiliary signal with reference intensity; and determinate that the compensation of the sensing signal is necessary when the maximum intensity is greater than the reference intensity.

20. The electronic device of claim 17, wherein the compensation determination circuit is configured to:

detect a peak value of a change amount in mutual capacitance between the plurality of first electrodes and the plurality of second electrodes; and determine that the compensation of the sensing signal is necessary when the number of the peak value is greater than or equal to two and maximum intensity of the auxiliary signal is greater than reference intensity.

* * * * *